US012810760B2

(12) United States Patent
Komanduru, V et al.

(10) Patent No.: US 12,810,760 B2
(45) Date of Patent: Nov. 24, 2026

(54) CONTENT RATE ADAPTATION FOR DISPLAY PROCESSING

(71) Applicant: QUALCOMM Incorporated, San Diego, CA (US)

(72) Inventors: Padmanabhan Komanduru, V, Hyderabad (IN); Dileep Marchya, Hyderabad (IN); Srinivas Pullakavi, Kakinada (IN); Vikas Batchu, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/976,203

(22) Filed: Dec. 10, 2024

(65) Prior Publication Data

US 2026/0162578 A1 Jun. 11, 2026

(51) Int. Cl.
*G09G 3/20* (2006.01)
*G06T 1/20* (2006.01)

(52) U.S. Cl.
CPC ................. *G09G 3/20* (2013.01); *G06T 1/20* (2013.01); *G09G 2310/08* (2013.01); *G09G 2340/0435* (2013.01)

(58) Field of Classification Search
CPC ................. G09G 3/20; G09G 2310/08; G09G 2340/0435; G06T 1/20
See application file for complete search history.

(56) References Cited

U.S. PATENT DOCUMENTS

| | | | | |
|---|---|---|---|---|
| 2017/0092236 | A1* | 3/2017 | Tripathi | G06F 3/1407 |
| 2018/0144724 | A1* | 5/2018 | Wood | G06F 3/14 |
| 2020/0104973 | A1* | 4/2020 | Zhang | G09G 5/12 |
| 2021/0400170 | A1* | 12/2021 | Lobete | H04N 7/0135 |
| 2023/0083932 | A1* | 3/2023 | Li | H04N 21/472 725/9 |
| 2024/0311950 | A1* | 9/2024 | Panneer | G06T 1/20 |
| 2025/0201160 | A1* | 6/2025 | Xu | G09G 3/20 |

* cited by examiner

*Primary Examiner* — Grant Sitta
(74) *Attorney, Agent, or Firm* — QUALCOMM Incorporated

(57) ABSTRACT

Aspects presented herein relate to methods and devices for display processing including an apparatus, e.g., a CPU. The apparatus may obtain an indication of an actual content render rate of an application based on a set of parameters, where the set of parameters is associated with the application that is running on a device. The apparatus may also obtain an indication of an updated content render rate of the application based on the actual content render rate of the application and a set of timestamps associated with a Vsync at the device. Further, the apparatus may identify an updated display refresh rate at the device based on the updated content render rate of the application and a current display refresh rate at the device. The apparatus may also output an indication of the updated display refresh rate at the device.

17 Claims, 11 Drawing Sheets

CONTENT RATE ADAPTATION FOR DISPLAY PROCESSING

TECHNICAL FIELD

The present disclosure relates generally to processing systems and, more particularly, to one or more techniques for display processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor or display processing unit (DPU).

A CPU or DPU may be configured to perform the processes of display processing. However, with the advent of wireless communication and smaller, handheld devices, there has developed an increased need for improved display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a central processing unit (CPU), a compositor, a central processor, a device, an application, a DPU, a display processor, a graphics processing unit (GPU), a graphics processor, or any apparatus that may perform for display processing. The apparatus may obtain an indication of at least one of: (1) a set of parameters associated with an application, or (2) a set of timestamps associated with a vertical synchronization (Vsync) at a device. The apparatus may also obtain an indication of an actual content render rate of an application based on a set of parameters, where the set of parameters is associated with the application that is running on a device. The apparatus may also obtain an indication of an updated content render rate of the application based on the actual content render rate of the application and a set of timestamps associated with a vertical synchronization (Vsync) at the device. Additionally, the apparatus may obtain an indication of a current display refresh rate at the device, where identification of an updated display refresh rate is based on obtainment of the current display refresh rate. The apparatus may also identify an updated display refresh rate at the device based on the updated content render rate of the application and a current display refresh rate at the device. Moreover, the apparatus may output an indication of the updated display refresh rate at the device. The apparatus may also configure a second set of parameters for a central processing unit (CPU) based on the updated display refresh rate at the device. The apparatus may also monitor at least one of: (1) the set of parameters associated with the application, or (2) the set of timestamps associated with the Vsync at the device. Further, the apparatus may determine that there is a change in at least one of: (1) the set of parameters associated with the application, or (2) the set of timestamps associated with the Vsync at the device. The apparatus may also obtain an indication of a new actual content render rate of the application; determine a new updated content render rate of the application based on the new actual content render rate of the application and the set of timestamps associated with the Vsync; determine a new updated display refresh rate at the device based on the new updated content render rate of the application and a new current display refresh rate at the device; and output an indication of the new updated display refresh rate at the device.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
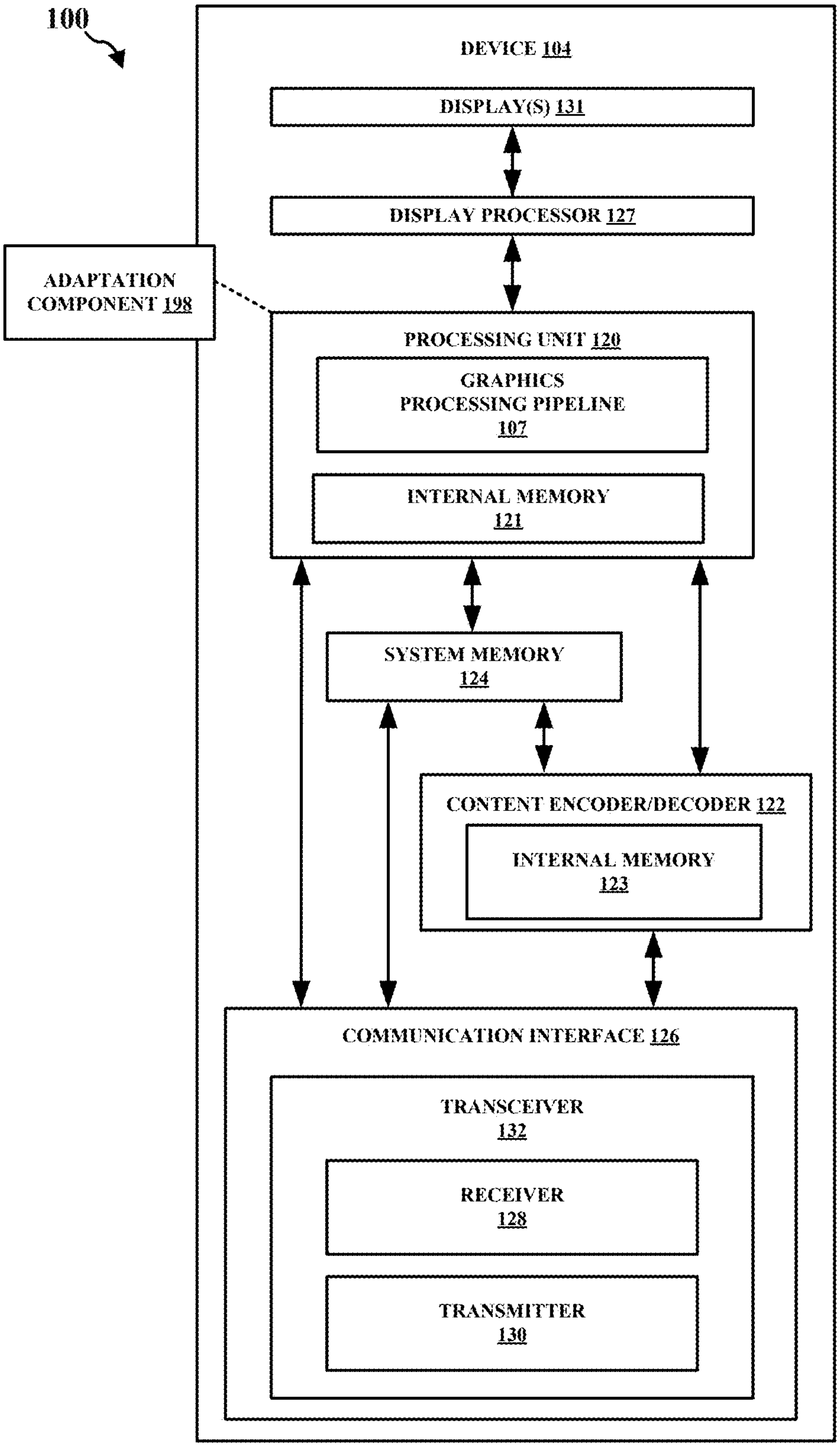
FIG. 1 is a block diagram that illustrates an example content generation system in accordance with one or more techniques of this disclosure.

An adaptive display refresh rate may refer to a refresh rate that adapts to a device or an application running on the device. For instance, an adaptive display refresh rate on a display panel may change based on the use case that is being exercised at the device or an application running on the device. Adaptive display refresh rate is a key feature to optimize the power at a device. A compositor may refer to software that provides applications with an off-screen buffer for each window. The compositor may composite the window buffers into an image representing the display screen and then writes the result into the display memory. In some instances, a compositor may have content rate-based adaptation of the display refresh rate. The algorithm may depend on the applications to indicate (i.e., vote) the corresponding content render rate, as applications can indicate which content render rate they deem suitable. The algorithm may then aggregate the content rate indications (i.e., votes) from all the applications and determine the display refresh rate. There are numerous types of applications (e.g., gaming applications) available in the market that render content at varying refresh rates (e.g., refresh rates of 24 Hz to 120 Hz). However, many applications may not specify the content render rate. That is, the applications may not specify the content render rate that causes the display to run at a higher refresh rate (e.g., 120 Hz, 144 Hz, or 180 Hz). Original equipment manufacturers (OEMs) may use a variety of display panels that can support different ranges of refresh rates (e.g., refresh rates between 1 Hz and 144 Hz). Also, device power consumption may vary based of the underlying system-on-chip (SoC) that drives the device (e.g., a smart phone). Moreover, third party application developers may not look at power implications of the applications when they are run on different devices. Thus, display refresh rate models that are based on application content rate indications (i.e., votes) may cover a small set of applications and may not be scalable to all the marketplace applications. Based on the above, and considering the constantly evolving range of display refresh rates, it may be beneficial to develop an algorithm that can perform a seamless alignment of display refresh rates to content rates and eliminate dependency on application developers. That is, it may be beneficial to consider the application's desires when setting the refresh rate at the display (e.g., the application specifying the content render rate), so the display may not run at a higher refresh rate than necessary (e.g., the display may not need to run a high rate of 120/144/180 Hz when a lower refresh rate will be fine). For instance, if a device does not receive any indications (i.e., votes) from applications regarding the refresh rate, it may be beneficial to be able to adjust the refresh rate. Aspects of the present disclosure may develop an algorithm that can align display refresh rates to content rates.

Aspects of the present disclosure may include a number of benefits or advantages. For instance, aspects of the present disclosure may develop an algorithm that can align display refresh rates to content rates. Aspects presented herein may also consider the application's desires when setting the refresh rate at the display. By doing so, aspects presented herein may optimize the display refresh rate and allow the display to not run at a higher refresh rate than necessary. Further, aspects presented herein may able to adjust the refresh rate without any indications (i.e., votes) from applications regarding the refresh rate. For instance, aspects presented herein may propose an algorithm that can accumulate information from applications in order to adjust the refresh rate and save power. That is, aspects presented herein may allow a display to optimize the display refresh rate in order to save power at the device. Additionally, aspects presented herein may consider the behavior of a display panel when setting the display refresh rate, such as variations in panel behavior (e.g., variations in vertical synchronization (VSync) behavior). As such, aspects presented herein may consider an application's desires and panel behavior when setting the display refresh rate in order to optimize the power consumption at the device.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended. In some examples, as used herein, the term "graphics workload" may refer to any workload or order associated with graphics processing. In some examples, as used herein, the term "texture fetch" may refer to a memory request, which incurs transactions from a cache (e.g., a texture cache). Each time a warp executes a texture function to read from texture memory, this may be a single texture fetch. Also, texture memory may be read-only device memory, and may be accessed using the device functions described in a texture function. Reading a texture using one of these functions may be called a "texture fetch." A "render target" may refer to a target block of pixels (buffer) into which rendering will occur. In some aspects, a render target may refer to a buffer where the pixels are drawn (e.g., a video card draws pixels) for a scene that is being rendered in the background. An intermediate render target may refer to a render target that is used in post-processing.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include an adaptation component 198 configured to obtain an indication of at least one of: (1) a set of parameters associated with an application, or (2) a set of timestamps associated with a vertical synchronization (Vsync) at a device. The adaptation component 198 may also be configured to obtain an indication of an actual content render rate of an application based on a set of parameters, where the set of parameters is associated with the application that is running on a device. The adaptation component 198 may also be configured to obtain an indication of an updated content render rate of the application based on the actual content render rate of the application and a set of timestamps associated with a vertical synchronization (Vsync) at the device. The adaptation component 198 may also be configured to obtain an indication of a current display refresh rate at the device, where identification of an updated display refresh rate is based on obtainment of the current display refresh rate. The adaptation component 198 may also be configured to identify an updated display refresh rate at the device based on the updated content render rate of the application and a current display refresh rate at the device. The adaptation component 198 may also be configured to output an indication of the updated display refresh rate at the device. The adaptation component 198 may also be configured to configure a second set of parameters for a central processing unit (CPU) based on the updated display refresh rate at the device. The adaptation component 198 may also be configured to monitor at least one of: (1) the set of parameters associated with the application, or (2) the set of timestamps associated with the Vsync at the device. The adaptation component 198 may also be configured to determine that there is a change in at least one of: (1) the set of parameters associated with the application, or (2) the set of timestamps associated with the Vsync at the device. The adaptation component 198 may also be configured to obtain an indication of a new actual content render rate of the application; determine a new updated content render rate of the application based on the new actual content render rate of the application and the set of timestamps associated with the Vsync; determine a new updated display refresh rate at the device based on the new updated content render rate of the application and a new current display refresh rate at the device; and output an indication of the new updated display refresh rate at the device. Although the following description may be focused on display processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
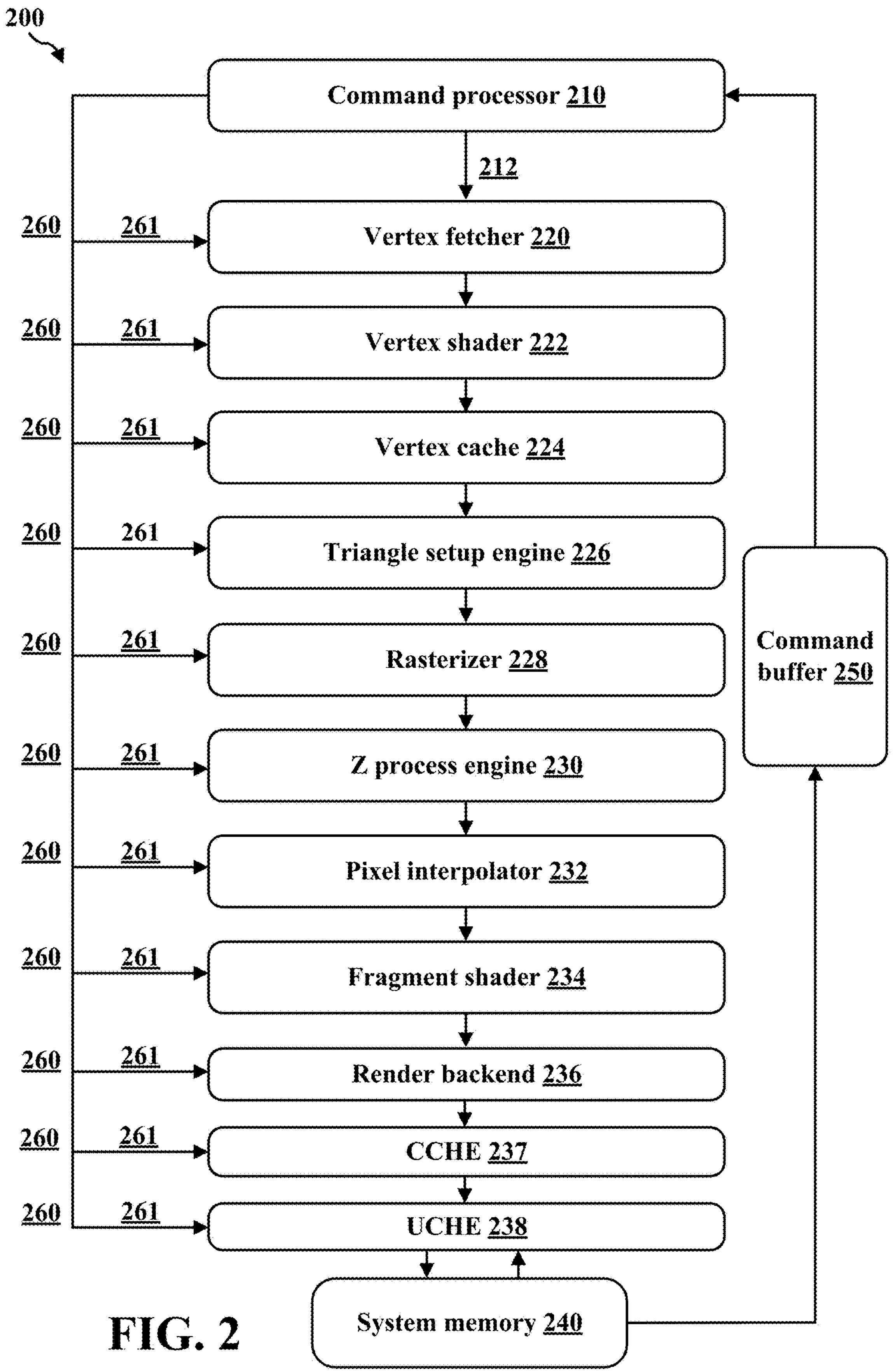
FIG. 2 illustrates an example graphics processing unit (GPU) in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 1 (L1) cache (cluster cache (CCHE)) 237, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUS may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in double data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Some types of GPUs may include different types of pipelines, such as a graphics processing pipeline. Graphics processing pipelines may include one or more of a vertex shader stage, a hull shader stage, a domain shader stage, a geometry shader stage, and a pixel shader stage. These stages of the graphics processing pipeline may be considered shader stages. These shader stages may be implemented as one or more shader programs that execute on shader units at a GPU. Shader units may be configured as a programmable pipeline of processing components. In some examples, a shader unit may be referred to as "shader processors" or "unified shaders," and may perform geometry, vertex, pixel, or other shading operations to render graphics. Shader units may include shader processors, each of which may include one or more components for fetching and decoding operations, one or more arithmetic logic units (ALUs) for carrying out arithmetic calculations, one or more memories, caches, and registers.

Figure 3:
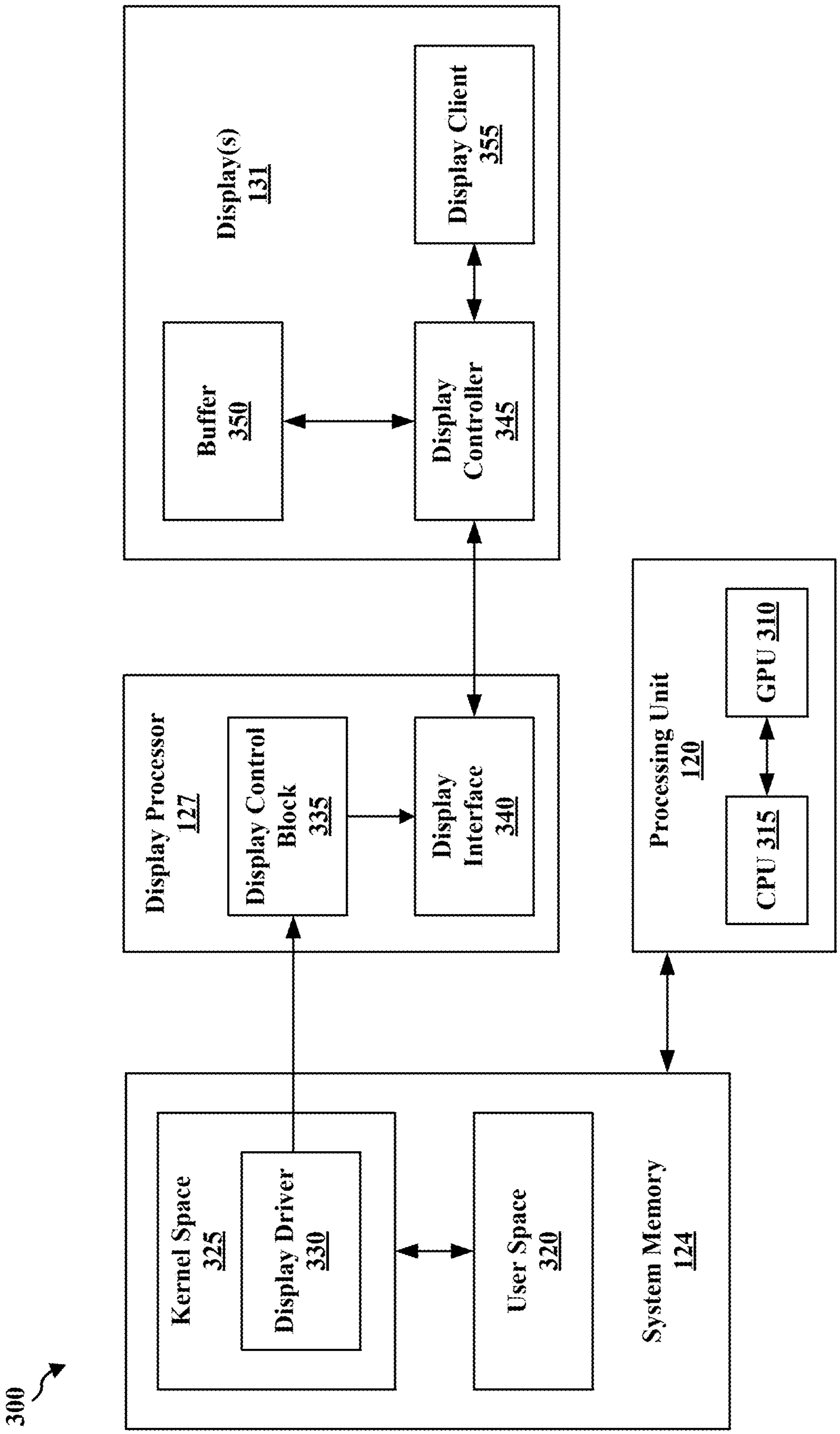
FIG. 3 illustrates an example display framework including a display processor and a display in accordance with one or more techniques of this disclosure.

FIG. 3 is a block diagram 300 that illustrates an example display framework including the processing unit 120, the system memory 124, the display processor 127, and the display(s) 131, as may be identified in connection with the device 104. A GPU may be included in devices that provide content for visual presentation on a display. For example, the processing unit 120 may include a GPU 310 configured to render graphical data for display on a computing device (e.g., the device 104), which may be a computer workstation, a mobile phone, a smartphone or other smart device, an embedded system, a personal computer, a tablet computer, a video game console, and the like. Operations of the GPU 310 may be controlled based on one or more graphics processing commands provided by a CPU 315. The CPU 315 may be configured to execute multiple applications concurrently. In some cases, each of the concurrently executed multiple applications may utilize the GPU 310 simultaneously. Processing techniques may be performed via the processing unit 120 output a frame over physical or wireless communication channels.

The system memory 124, which may be executed by the processing unit 120, may include a user space 320 and a kernel space 325. The user space 320 (sometimes referred to as an "application space") may include software application(s) and/or application framework(s). For example, software application(s) may include operating systems, media applications, graphical applications, workspace applications, etc. Application framework(s) may include frameworks used by one or more software applications, such as libraries, services (e.g., display services, input services, etc.), application program interfaces (APIs), etc. The kernel space 325 may further include a display driver 330. The display driver 330 may be configured to control the display processor 127. For example, the display driver 330 may cause the display processor 127 to compose a frame and transmit the data for the frame to a display.

The display processor 127 includes a display control block 335 and a display interface 340. The display processor 127 may be configured to manipulate functions of the display(s) 131 (e.g., based on an input received from the display driver 330). The display control block 335 may be further configured to output image frames to the display(s) 131 via the display interface 340. In some examples, the display control block 335 may additionally or alternatively perform post-processing of image data provided based on execution of the system memory 124 by the processing unit 120.

The display interface 340 may be configured to cause the display(s) 131 to display image frames. The display interface 340 may output image data to the display(s) 131 according to an interface protocol, such as, for example, the MIPI DSI (Mobile Industry Processor Interface, Display Serial Interface). That is, the display(s) 131, may be configured in accordance with MIPI DSI standards. The MIPI DSI standard supports a video mode and a command mode. In examples where the display(s) 131 is/are operating in video mode, the display processor 127 may continuously refresh the graphical content of the display(s) 131. For example, the entire graphical content may be refreshed per refresh cycle (e.g., line-by-line). In examples where the display(s) 131 is/are operating in command mode, the display processor 127 may write the graphical content of a frame to a buffer 350.

In some such examples, the display processor 127 may not continuously refresh the graphical content of the display(s) 131. Instead, the display processor 127 may use a vertical synchronization (Vsync) pulse to coordinate rendering and consuming of graphical content at the buffer 350. For example, when a Vsync pulse is generated, the display processor 127 may output new graphical content to the buffer 350. Thus, generation of the Vsync pulse may indicate that current graphical content has been rendered at the buffer 350.

Frames are displayed at the display(s) 131 based on a display controller 345, a display client 355, and the buffer 350. The display controller 345 may receive image data from the display interface 340 and store the received image data in the buffer 350. In some examples, the display controller 345 may output the image data stored in the buffer 350 to the display client 355. Thus, the buffer 350 may represent a local memory to the display(s) 131. In some examples, the display controller 345 may output the image data received from the display interface 340 directly to the display client 355.

The display client 355 may be associated with a touch panel that senses interactions between a user and the display(s) 131. As the user interacts with the display(s) 131, one or more sensors in the touch panel may output signals to the display controller 345 that indicate which of the one or more sensors have sensor activity, a duration of the sensor activity, an applied pressure to the one or more sensor, etc. The display controller 345 may use the sensor outputs to determine a manner in which the user has interacted with the display(s) 131. The display(s) 131 may be further associated with/include other devices, such as a camera, a microphone, and/or a speaker, that operate in connection with the display client 355.

Some processing techniques of the device 104 may be performed over three stages (e.g., stage 1: a rendering stage; stage 2: a composition stage; and stage 3: a display/transfer stage). However, other processing techniques may combine the composition stage and the display/transfer stage into a single stage, such that the processing technique may be executed based on two total stages (e.g., stage 1: the rendering stage; and stage 2: the composition/display/transfer stage). During the rendering stage, the GPU 310 may process a content buffer based on execution of an application that generates content on a pixel-by-pixel basis. During the composition and display stage(s), pixel elements may be assembled to form a frame that is transferred to a physical display panel/subsystem (e.g., the displays 131) that displays the frame.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Some aspects of display processing may utilize different types of mask layers, e.g., a shape mask layer. A mask layer is a layer that may represent a portion of a display or display panel. For instance, an area of a mask layer may correspond to an area of a display, but the entire mask layer may depict a portion of the content that is actually displayed at the display or panel. For example, a mask layer may include a top portion and a bottom portion of a display area, but the middle portion of the mask layer may be empty. In some examples, there may be multiple mask layers to represent different portions of a display area. Also, for certain portions of a display area, the content of different mask layers may overlap with one another. Accordingly, a mask layer may represent a portion of a display area that may or may not overlap with other mask layers.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit. The term "frame" may refer to a frame or an image utilized in display processing. The term "depth frame" may refer to a frame that includes information pertaining to a distance at which an object in a frame is to be rendered with respect to a position of a user. The term "wearable display device" may refer to a device that is capable of being worn by a user to display content (e.g., a head device, a head mounted display (HMD), glasses, etc.). The term "workload" may refer to a workload that is processed at a graphics processor or a GPU (e.g., a vertex or pixel workload). The term "field of view" or "FOV" may refer to a range of an observable world that is visible at any given time through a human eye, through a camera viewfinder, or on a display screen. The term "static" may refer to lacking in movement, unchanging, or still. The term "aggregate" may refer to combining, assembling, or grouping into a cluster or a class. The terms "post-processing" may include adjusting a brightness of pixels, tone mapping pixels, gamma correcting pixels, and/or performing picture adjusting with respect to pixels. Post-processing a frame may include composing the frame to generate the post-processed frame. The term "usage pattern" may refer to a pattern of usage, e.g., for an application. The term "blend" may refer to blending, combining, or mixing pixels in frames for display processing.

A display processor (e.g., a display processing unit (DPU)) may transfer an entire frame buffer to a display panel (e.g., a display panel operating in video mode) regardless of a temporal change in a scene being displayed, that is, the display processor may transfer both static regions and non-static regions for each frame to the display panel. However, some pixels may remain static from frame to frame. A display pipeline (e.g., a display pipeline of a smartphone or a tablet) may be configured in a fixed configuration. For instance, display processing blocks may be configured once and the display processing blocks may be used in the same manner on each refresh occurrence. This may lead to redundant pixel processing (i.e., pixel processing repeated on regions of frames which do not change on a frame-by-frame basis). Redundant pixel processing may be associated with an inefficient use of computing resources.

Figure 4:
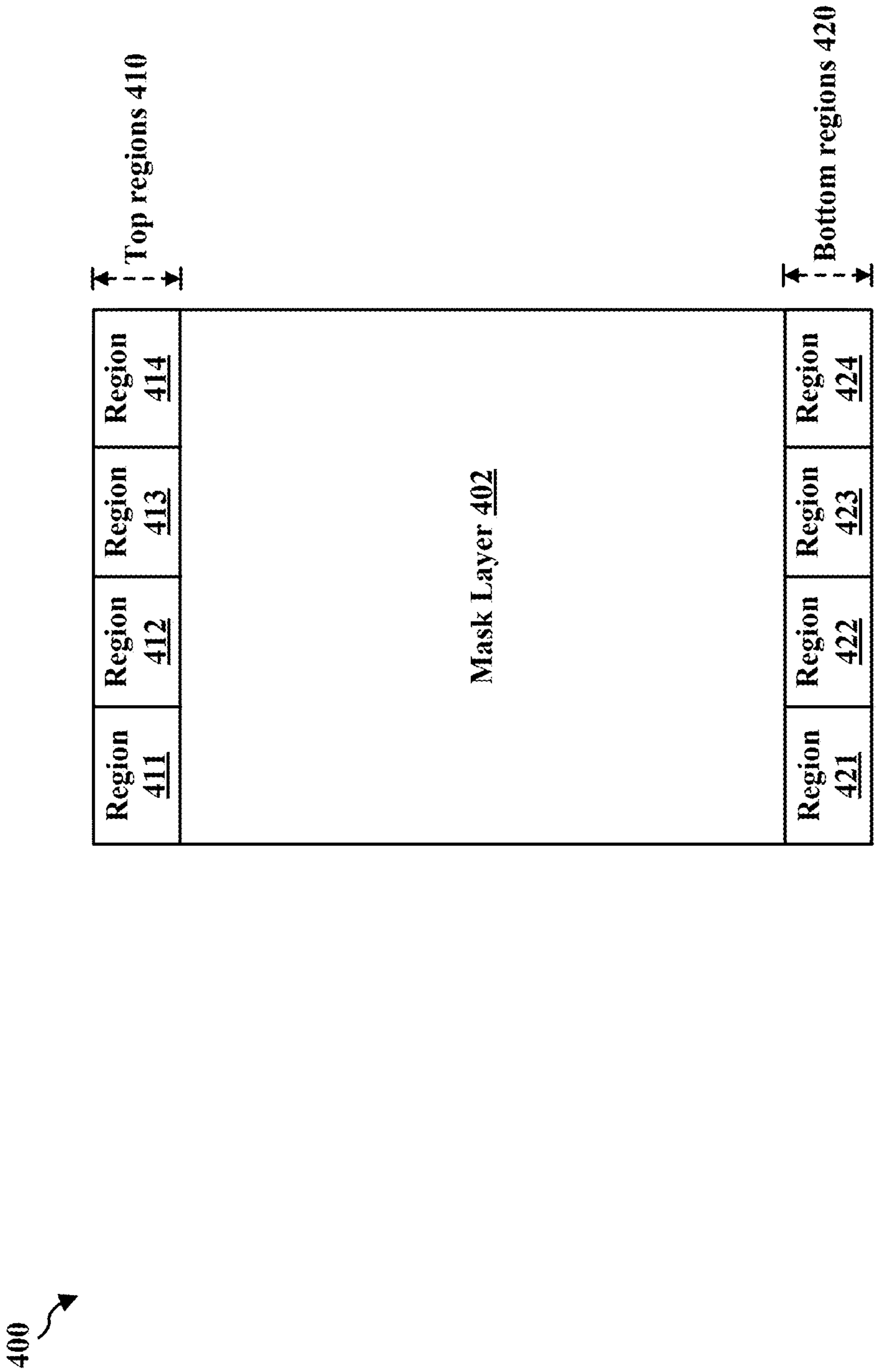
FIG. 4 is a diagram illustrating an example mask layer for display processing in accordance with one or more techniques of this disclosure.

FIG. 4 is a diagram 400 illustrating an example mask layer for display processing. More specifically, diagram 400 depicts one type of mask layer that may represent portions of a display panel. As shown in FIG. 4, diagram 400 includes mask layer 402 including top regions 410 and bottom regions 420. Top regions 410 include region 411, region 412, region 413, and region 414, and bottom regions 420 include region 421, region 422, region 423, and region 424. As depicted in FIG. 4, mask layer 402 may represent the different regions that are displayed on a display panel.

Some types of displays may use a certain type of mask layer (e.g., a shape mask layer) to reshape a display frame. For instance, a mask layer may reshape the display frame to provide more optimized visual shapes at the display panel (e.g., improved round corners, improved circular shape, improved rectangular shape, etc.). These types of mask layers (e.g., shape mask layers) may be processed by software (e.g., graphics processing unit (GPU) software or central processing unit (CPU) software) or by hardware (e.g., display processing unit (DPU) hardware). Also, these mask layers may be processed by other specific types of hardware logic modules (e.g., modules in a display driver integrated circuit (DDIC) or bridge chips). In some aspects, these types of mask layers (e.g., shape mask layers) may be based on certain unit, such as a pixel. That is, the shape generation basis unit of the shape mask layers may be a single pixel.

Some aspects of display processing may utilize frame buffers to cache or store a composition output of a GPU. For instance, display layers may be cached or stored in a frame buffer after composition at a GPU. In some aspects, a composition hardware (HW) or software (SW) stack may use a frame buffer target to cache a composition output (e.g., a GPU composition output or a CPU composition output). The cached composition output may then be sent to another processor (e.g., a DPU) as an input layer. The frame buffer may have a number of different color formats, such as a red (R) green (G) blue (B) alpha (A) (RGBA) format (e.g., RGBA8888 format). Also, the frame buffer may be a certain size, (e.g., a 32-bit triple buffer). For example, at the beginning of a display/graphics subsystem design, a frame buffer may be created as an RGBA8888 format and a 32-bit triple buffer. In some instances, if the frame layers do not use a certain composition (e.g., a GPU or client composition), the frame buffers may be ignored. Also, the layers (e.g., frame layers or display layers associated with display processing) may be directly fetched and composed. For instance, a DPU or hardware composer may directly fetch the layers and then compose the layers.

Figure 5:
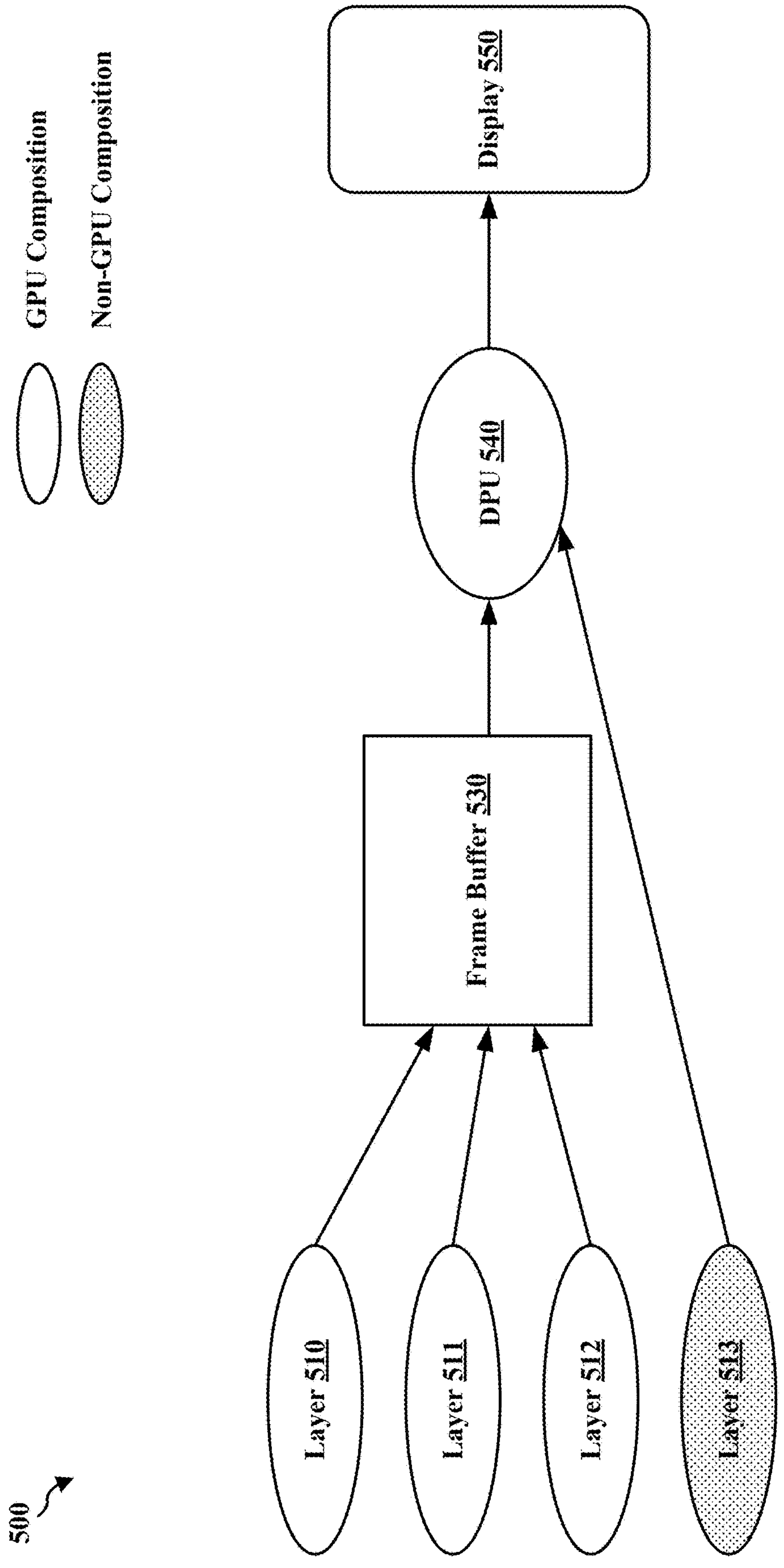
FIG. 5 is a diagram illustrating an example layer composition scheme for display processing in accordance with one or more techniques of this disclosure.

FIG. 5 is a diagram 500 illustrating an example of a layer composition scheme for display processing. More specifically, diagram 500 depicts a layer composition of display layers where certain layers (e.g., layers of a certain composition) are cached in a frame buffer, and some layers are directly fetched and composed by a DPU. As shown in FIG. 5, diagram 500 includes layer 510, layer 511, layer 512, layer 513, frame buffer 530 (e.g., an RGBA8888 format frame buffer), DPU 540, and display 550. FIG. 5 depicts that layers composed at a GPU (i.e., layers associated with GPU composition) may be cached or stored in a frame buffer. For example, layer 510, layer 511, and layer 512 may be composed at a GPU and then cached/stored at frame buffer 530. Alternatively, layers that are not composed at a GPU (i.e., layers associated with non-GPU composition) may be directly fetched and composed at a DPU. For instance, layer 513 may be directly fetched and composed at DPU 540. That is, layer 510, layer 511, and layer 512 may be a certain type of composition (e.g., GPU composition), while layer 513 may be another type of composition (non-GPU composition). After being cached/stored in frame buffer 530, the layer 510, layer 511, and layer 512 may be sent to DPU 540. Further, after processing at DPU 540, the layers 510-513 may be sent to display 550.

Some types of display processing devices (e.g., mobile devices, computers, TVs, or other consumer devices) may utilize complex multiple content layouts in a single display processing layer or multiple display processing layers. That is, for graphics or display stacks in operating systems of the devices, there may be a single display processing layer (i.e., display layer or layer that is associated with display processing) or multiple display processing layers. For instance, there may be at least one display layer that may be associated with a screen or frame for a display processing device, such that the display panel at the device may be divided amongst the display layers. Additionally, for content or end users, there may be multiple content entities in the display processing layer. This may be due to operating system limitations and/or application rendering/resource management limitations. Further, some types of applications may choose to render in using a single display processing layer. Color processing capability on a per-region basis (i.e., for each region of interest (ROI) in a layer) may be utilized with certain types of display processing unit (DPU) architecture.

Different types of DPU image processing (e.g., DPU per-layer flexible image processing) may be utilized by current mobile consumer electronics devices. Based on the content of different layers, providing accurate per-layer image processing may be important to the perception of an end user. There may be a number of different types of per-layer image processing, such as video high dynamic range (HDR) layer tone mapping and processing and/or video standard dynamic range (SDR) layer visual contrast boosting. Types of per-layer image processing may also include proper tone mapping for photo image layers, game layer color processing and flexible visual control options provided to end users, flexible visual control options for video layers provided to end users, and flexible visual control options for texts/user interface (UI) layers provided to end users.

Display processing units (DPUs) may be included in a number of different display devices (e.g., smart phones or user equipments (UEs)). In some aspects, DPUs may be utilized to determine a certain bandwidth (e.g., a double data rate (DDR) bandwidth), as a DPU may blend and transfer data to a display panel for each line in a frame or display. Also, this blending and transferring of data may be performed within a fixed line time for the frame or display. Display bandwidth requests or selections (i.e., display bandwidth votes) may account for total number of pixels that may need to be fetched to produce a line in a frame or display. Thus, the display bandwidth request or vote may increase in proportion to a total number of overlapping layers in a frame or display.

In some aspects, a display bandwidth vote (i.e., a display bandwidth request or selection) may be a request from the DPU for an amount of display bandwidth from the display hardware. For instance, a display bandwidth vote may be a request for an increase in bandwidth for a corresponding increase in voltage or power. For example, a display bandwidth vote may be based on a number of overlaps, a frame rate, a vertical active amount, a horizontal active amount, and a number of bytes per pixel. As an equation, display bandwidth vote=(number of overlaps)*(frame rate)*(vertical active amount)*(horizontal active amount)*(number of bytes per pixel). For example, a home screen display may include the following display bandwidth vote: display bandwidth vote=4*60*1440*2560*4=3.3 gigabytes per second (Gbps), e.g., on 1440×2560 display at 60 Hz.

Display processing units (DPUs) may transfer pixel data to certain components (e.g., a display driver integrated circuit (DDIC)) at a constant rate. That is, each line (i.e., a display line) in the display may be transferred (e.g., transferred to DDIC memory) in a fixed time. Also, each line in the display may be transferred regardless of the time available before pixel data is consumed by a certain display component (e.g., a display controller (DC)). For example, during a video play application, although a certain amount of lines is updated (e.g., 608 lines of 2520 are updated), the DPU may still need to transfer these lines in a certain amount of time (e.g., transfer 608 lines in 608/2520 time). Further, the display controller may have a certain number of static lines (e.g., 1912 static lines) to refresh from a previous frame before consuming these new lines.

Figure 6:
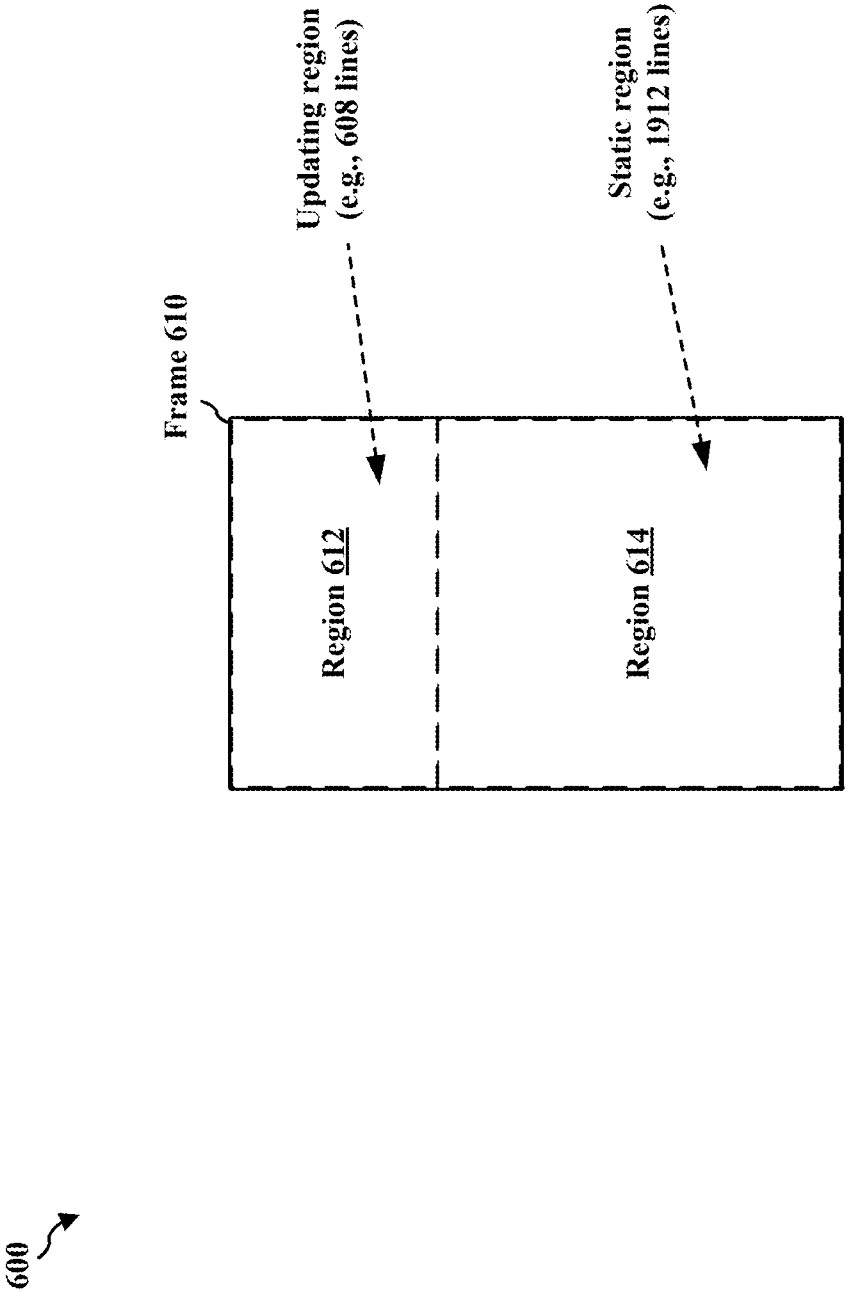
FIG. 6 is a diagram illustrating an example of a frame in accordance with one or more techniques of this disclosure.

FIG. 6 includes diagram 600 illustrating an example of a frame at a display device. More specifically, diagram 600 illustrates a frame 610 including an updating region (e.g., region 612) and a static region (e.g., region 614). As shown in FIG. 6, diagram 600 includes frame 610, region 612 (i.e., updating region) with a certain amount of lines (e.g., 608 lines), and region 614 (i.e., static region) with a certain amount of lines (e.g., 1912 lines). As depicted in FIG. 6, a portion of frame 610 may update a certain amount of lines at a time (e.g., region 612 may update 608 lines at a time). Also, a portion of frame 610 may include a certain amount of lines that are static or not updated (e.g., region 614 may include 1912 static lines). Moreover, the display controller for frame 610 may have a certain number of static lines corresponding to region 614 (e.g., 1912 static lines) to refresh from a previous frame before consuming these new lines. Region 612 and region 614 may be referred to as a region of interest (ROI) or a display ROI. Accordingly, FIG. 6 is an example of updating display lines based on a display region of interest (ROI).

In some aspects, certain bandwidths for a partial frame update (i.e., an update of content for a portion of the frame) may be equivalent to a full frame update (i.e., an update of content for a full frame). That is, due to a partial frame composition algorithm, certain bandwidths for partial frame updates may need to be clocked (i.e., utilize a display clock resource) at the same level as a full frame. For example, a DPU bandwidth, display serial interface (DSI) bandwidth, and/or double data rate (DDR) bandwidth may need to be clocked at the same level as a full frame. Additionally, as the refresh rates for displays (e.g., 120 Hz, 144 Hz, 180 Hz, 240 Hz, etc.) have increased, the amount of display power utilized has correspondingly increased. In some instances, as indicated above, a DPU may transfer pixel data to a component (e.g., a display driver integrated circuit (DDIC)) at a constant rate regardless of the time available before pixel data is consumed. For instance, a DPU may transfer pixel data to a DDIC at a constant rate regardless of the time available before pixel data is consumed by a display controller (DC). For example, video playback may update a certain number of lines (e.g., 608 lines out of 2520 lines), yet the DC may still refresh 1912 static lines before consuming these new lines.

In some aspects, a display refresh rate may refer to the number of times per second that an image on the display screen updates. The display refresh rate is measured in hertz (Hz). For example, a 60 Hz display may refresh 60 times per second, while a 144 Hz display may refresh 144 times per second. A higher refresh rate may make the image on a display screen appear smoother and reduce motion blur. This may be beneficial for activities like gaming and watching videos, where fast-paced visuals are common. In some instances, display panels in the market may have a wide range of variations in frames-per-second (FPS) and refresh rates that can be supported. For example, display panels may support a maximum of 144 FPS or 180 FPS. There may be a number of different FPS or refresh rates that display panels can support with recent technological advances. For instance, with advancements in display processing, display panels may be able to support low refresh rates (e.g., as low as 1 Hz). So there is a lot of scope within display panels to change the refresh rate based on the use case.

An adaptive display refresh rate may refer to a refresh rate that adapts to a device or an application running on the device. For instance, an adaptive display refresh rate on a display panel may change based on the use case that is being exercised at the device or an application running on the device. Adaptive display refresh rate is a key feature to optimize the power at a device. A compositor may refer to software that provides applications with an off-screen buffer for each window. The compositor may composite the window buffers into an image representing the display screen and then writes the result into the display memory. In some instances, a compositor may have content rate-based adaptation of the display refresh rate. The algorithm may depend on the applications to indicate (i.e., vote) the corresponding content render rate, as applications can indicate which content render rate they deem suitable. The algorithm may then aggregate the content rate indications (i.e., votes) from all the applications and determine the display refresh rate.

There are numerous types of applications (e.g., gaming applications) available in the market that render content at varying refresh rates (e.g., refresh rates of 24 Hz to 120 Hz). However, many applications may not specify the content render rate. That is, the applications may not specify the content render rate that causes the display to run at a higher refresh rate (e.g., 120 Hz, 144 Hz, or 180 Hz). Original equipment manufacturers (OEMs) may use a variety of display panels that can support different ranges of refresh rates (e.g., refresh rates between 1 Hz and 144 Hz). Also, device power consumption may vary based of the underlying system-on-chip (SoC) that drives the device (e.g., a smart phone). Moreover, third party application developers may not look at power implications of the applications when they are run on different devices. Thus, display refresh rate models that are based on application content rate indications (i.e., votes) may cover a small set of applications and may not be scalable to all the marketplace applications.

Based on the above, and considering the constantly evolving range of display refresh rates, it may be beneficial to develop an algorithm that can perform a seamless alignment of display refresh rates to content rates and eliminate dependency on application developers. That is, it may be beneficial to consider the application's desires when setting the refresh rate at the display (e.g., the application specifying the content render rate), so the display may not run at a higher refresh rate than necessary (e.g., the display may not need to run a high rate of 120/144/180 Hz when a lower refresh rate will be fine). For instance, if a device does not receive any indications (i.e., votes) from applications regarding the refresh rate, it may be beneficial to be able to adjust the refresh rate. That is, it may be beneficial to propose algorithm that can accumulate information from applications in order to adjust the refresh rate and save power. Indeed, it may be beneficial to allow a display to optimize the display refresh rate in order to save power at the device. Also, it may be beneficial to consider a panel behavior when setting the display refresh rate, as the panel behavior may vary (e.g., the vertical synchronization (VSync) behavior may vary) which can cause inconsistencies in power consumption, such that the power consumption may be higher than necessary. Accordingly, it may be beneficial to consider the applications desires and the panel behavior when setting the display refresh rate in order to optimize the power consumption at the device.

Aspects of the present disclosure may develop an algorithm that can align display refresh rates to content rates. Aspects presented herein may also consider the application's desires when setting the refresh rate at the display. By doing so, aspects presented herein may optimize the display refresh rate and allow the display to not run at a higher refresh rate than necessary. Further, aspects presented herein may able to adjust the refresh rate without any indications (i.e., votes) from applications regarding the refresh rate. For instance, aspects presented herein may propose an algorithm that can accumulate information from applications in order to adjust the refresh rate and save power. That is, aspects presented herein may allow a display to optimize the display refresh rate in order to save power at the device. Additionally, aspects presented herein may consider the behavior of a display panel when setting the display refresh rate, such as variations in panel behavior (e.g., variations in vertical synchronization (VSync) behavior). As such, aspects presented herein may consider an application's desires and panel behavior when setting the display refresh rate in order to optimize the power consumption at the device.

In some instances, aspects presented herein (e.g., a CPU or compositor) may obtain an indication of a set of parameters associated with an application that is running on a device, or a set of timestamps associated with a Vsync at the device. Also, aspects presented herein (e.g., a CPU or compositor) may obtain an actual content render rate of an application based on a set of parameters associated with the application that is running on a device. Further, aspects presented herein (e.g., a CPU or compositor) may obtain or determine an updated content render rate of the application based on the actual content render rate of the application and a set of timestamps associated with the Vsync at the device. Aspects presented herein (e.g., a CPU or compositor) may also obtain an indication of the current display refresh rate at the device. Moreover, aspects presented herein (e.g., a CPU or compositor) may identify or determine an updated display refresh rate at the device based on the updated content render rate of the application and a current display refresh rate at the device. Aspects presented herein (e.g., a CPU or compositor) may transmit, to a DPU, the updated display refresh rate at the device. The updated display refresh rate may be an optimal display refresh rate based on the frame rate adaptation model. Based on the updated display refresh rate at the device, aspects presented herein (e.g., a CPU or compositor) may configure a set of parameters at the CPU. By doing so, aspects presented herein (e.g., a CPU or compositor) may optimize the power consumption at the device.

Aspects presented herein may utilize a software learning model where the end goal is to arrive at an optimal refresh rate, so the display panel can be run based on an application behavior and a panels behavior (e.g., tearing effect (TE) variations). That is, aspects herein propose a learning model that arrives at an optimal display refresh rate based on application rendering dynamics, Vsync variations, and display driver integrated circuit (DDIC) tearing effect (TE) variation. A display tearing effect (TE), also referred to as screen tearing, may be a visual artifact that occurs when a display is distorted due to the incorrect rendering of fast-changing images. A tearing effect can appear as a short-lived glitch or a persistent distortion that can cause eye strain. Also, a tearing effect may be synonymous with a Vsync signal, which is used to synchronize the display refresh rate with the content render rate. The end goal of the software learning model of aspects presented herein may be to obtain an optimal refresh rate and save power at the device. In some aspects, the application may not be providing an indication (i.e., vote) or a hint specifying the behavior of the application (e.g., the application is running at 60 FPS), so there is no communication from the application to the compositor. So aspects herein may utilize an algorithm to detect the behavior of the application without any indication (i.e., vote) or hint coming from the application.

In some aspects, there may be a buffer queue between the compositor and the application. So based on the frequency at which the rendering may occur, there may be a queue frequency that the application buffers that comes from the application to the compositor. Aspects herein may utilize an algorithm (e.g., an algorithm in the compositor) to monitor the frequency at which the rendered frames are submitted to the compositor. For example, this may be the render queue frequency or the render dequeue frequency (e.g., dequeue latency). Thus, whenever the application queues are buffered to be displayed, aspects presented herein may it try to dequeue buffer from the compositor, so that it can render the next available content. So based on the frequency or the latency, at first the dequeue happens. The algorithm may then monitor if there is a changing pattern from the application with respect to the application queuing the content to the compositor. In some aspects, if an application tries to render the content at a certain FPS (e.g., at 120 FPS), it may attempt to dequeue at the same FPS (e.g., 120 FPS). So based on that, there may be a different dequeuer latency pattern. Aspects herein may detect there is a new content that is trying to be rendered at a different rate. Based on this, aspects herein may adjust the refresh rates accordingly.

Aspects presented herein may also consider the display panel behavior when adjusting the refresh rates. That is, based on various like practical conditions (e.g., the device temperature variations and the jitters arising out of the panel), aspects herein may adjust the refresh rates. Also, aspects herein may consider the Vsync period, which is the duration between the Vsync interrupts that come from the panel. So the algorithm also may account for the modifying Vsync, such as the variations within the Vsync that are caused by the panel key. Each of these factors (e.g., queue frequency, dequeue frequency, latencies, and the Vsync variations) may be an input to the algorithm in order to determine what is the final optimal refresh rate on which the panel has to run.

As indicated herein, aspects herein may utilize input parameters to a model or algorithm that can adjust the refresh rates. For instance, aspects herein may utilize an application behavior for a model or algorithm that can adjust the refresh rates. For example, aspects herein may utilize a queue frequency as an input parameter to a model or algorithm to adjust the refresh rates. That is, the algorithm may monitor a rendered frame submission frequency into a compositor (i.e., render buffer queue) in order to adjust the refresh rate. Also, aspects herein may utilize a dequeue frequency as an input parameter to a model or algorithm to adjust the refresh rates. That is, the algorithm may monitor an application's demand for free buffers which are used to render new content (i.e., render buffer dequeue) in order to adjust the refresh rate. Moreover, aspects herein may utilize a panel behavior as an input parameter to a model or algorithm to adjust the refresh rates. For example, aspects herein may utilize Vsync variations as an input parameter. That is, the algorithm may monitor Vsync variations, such as if the display panel Vsync interrupts vary due to certain reasons (e.g., device temperature, panel jitters, etc.), which may also be referred to as DDIC tearing effect.

The algorithm may process these inputs and arrive at an optimal refresh rate considering a number of aspects. For instance, the algorithm may consider render rate normalization. That is, the algorithm may compute a desired application render rate from the average queue rate and average Vsync rate. The Vsync variation may directly impacts queue frequency (e.g., in case of a 120 FPS display refresh rate, if the panel generates a TE at an average FPS (e.g., 123 FPS), then the application render rate can occur at 62 FPS, even though the desired rate is 60 FPS). The algorithm may learn the relation between application render rate and panel TE fluctuations and accordingly arrive at a desired application render rate. The desired render rate may be used to compute possible display refresh rate from the list of supported display panel refresh rates.

Additionally, the algorithm may adapt to application render rate changes. That is, the algorithm may detect an application or system intent to change a render rate based on abrupt changes in dequeue frequency. Also the render rate may increase/decrease due to a number of factors (e.g., user actions, GPU thermal mitigations, GPU load, etc.). The algorithm may monitor the dequeue rate with respect to the current panel frequency, restore the original refresh rate based on any sudden changes, and converge on an optimal refresh rate. Using the aforementioned parameters, algorithms presented herein may guarantee on-time switches across various refresh rates in such a way that application/gaming performance may not be affected (e.g., due to a display tuning itself to content rate). Also, using the aforementioned inputs and parameters, the software at the compositor may optimize the display refresh rate. In turn, this may allow aspects presented herein to optimize the power consumption at the DPU, CPU, and the display panel.

Figure 7:
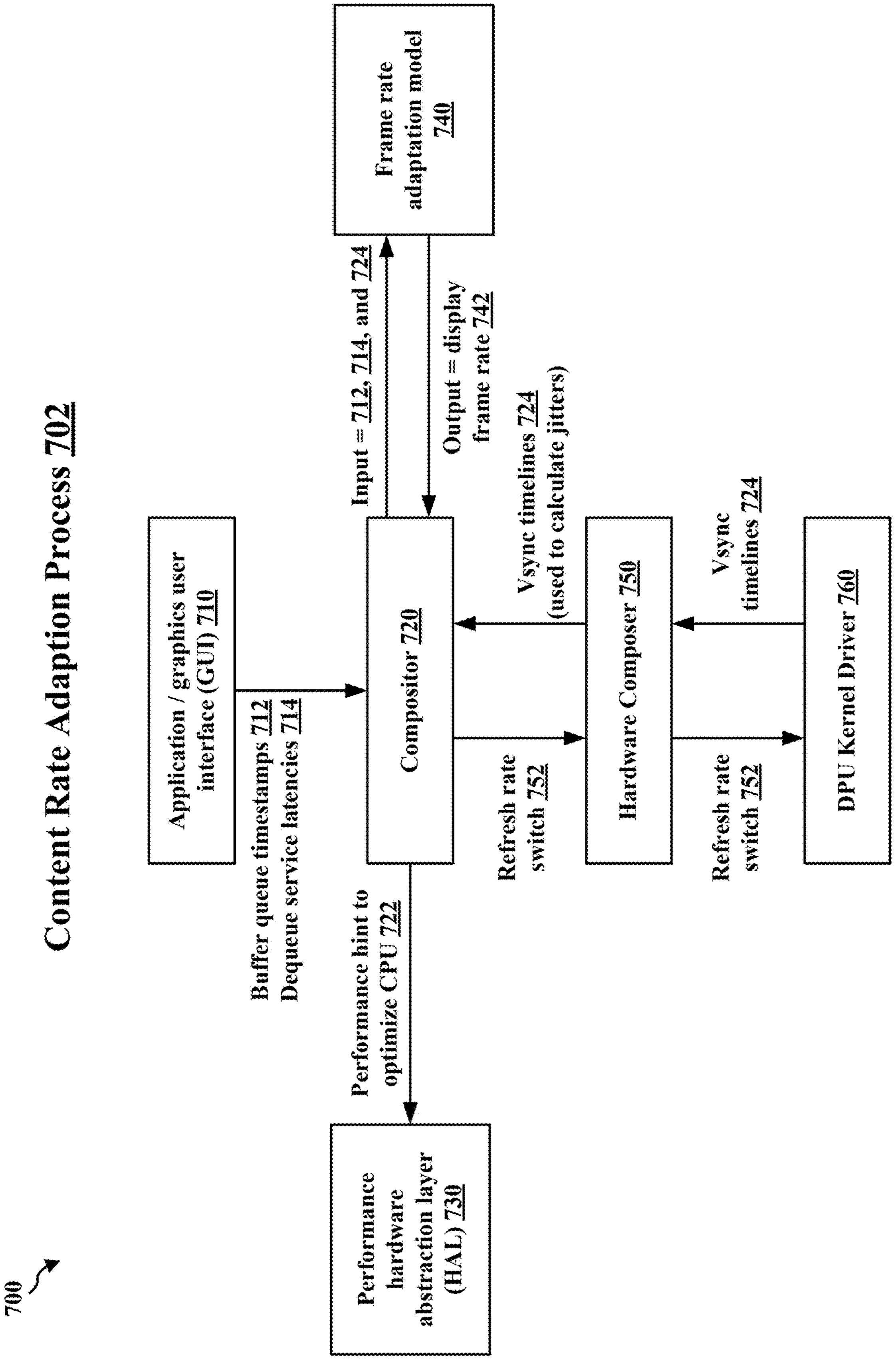
FIG. 7 is a diagram illustrating an example content rate adaptation process in accordance with one or more techniques of this disclosure.

FIG. 7 illustrates diagram 700 including one example of a content rate adaptation process. More specifically, diagram 700 depicts a content rate adaptation process 702 that utilizes the aforementioned considerations. As shown in FIG. 7, diagram 700 includes application/graphics user interface (GUI) 710, compositor 720, performance hardware abstraction layer (HAL) 730 (e.g., a software module that helps optimize the performance of the SoC), frame rate adaptation model 740, hardware composer 750, and DPU kernel driver 760. FIG. 7 depicts that application/GUI 710 may send a number of parameters to the compositor 720. For example, application/GUI 710 may send buffer queue timestamps 712 and dequeuer service latencies 714 to the compositor. Also, the DPU kernel driver 760 may send Vsync timelines 724 to hardware composer 750. In turn, hardware composer 750 may send the Vsync timelines 724 (e.g., used to calculate jitters) to the compositor 720. The compositor 720 may then send several parameters as an input to the frame rate adaptation model 740. For example, compositor 720 may send buffer queue timestamps 712, dequeuer service latencies 714, and Vsync timelines 724 as an input to the frame rate adaptation model 740. The output of frame rate adaptation model 740 may be the display frame rate 742. For instance, the frame rate adaptation model 740 may output the display frame rate 742 to the compositor. Based on this, the compositor 720 may send a performance hint to optimize a CPU 722 to the performance HAL 730. The compositor 720 may also send a refresh rate switch 752 to the hardware composer 750. In turn, the hardware composer 750 may send the refresh rate switch 752 to the DPU kernel driver 760.

As shown in FIG. 7, the compositor 720 may obtain an indication of a set of parameters associated with an application that is running on a device (e.g., buffer queue timestamps 712 and dequeuer service latencies 714) or a set of timestamps associated with a Vsync at the device (e.g., Vsync timelines 724). Also, the compositor 720 may obtain an actual content render rate of an application based on a set of parameters associated with the application that is running on a device (e.g., buffer queue timestamps 712 and dequeuer service latencies 714). Further, the compositor 720 may obtain or determine an updated content render rate of the application based on the actual content render rate of the application and a set of timestamps associated with the Vsync at the device (e.g., Vsync timelines 724). The compositor 720 may also obtain an indication of the current display refresh rate at the device. Moreover, the compositor 720 may identify or determine an updated display refresh rate at the device (e.g., refresh rate switch 752) based on the updated content render rate of the application and a current display refresh rate at the device. The compositor 720 may transmit, to a DPU, the updated display refresh rate at the device (e.g., refresh rate switch 752). The updated display refresh rate (e.g., refresh rate switch 752) may be an optimal display refresh rate based on the frame rate adaptation model. Based on the updated display refresh rate at the device (e.g., refresh rate switch 752), the compositor 720 may configure a set of parameters at the CPU. By doing so, the compositor 720 may optimize the power consumption at the device.

As depicted in FIG. 7, aspects presented herein may optimize the display refresh rate at a device. For example, if an existing device behavior is that an application/game renders at 60 FPS and a display refreshes at 120 Hz, aspects presented herein may allow for an updated device behavior where an application/game renders at 60 FPS and the display refreshes at 60 Hz. Also, aspects presented herein may optimize the power consumption at a CPU and/or a device. For example, aspects presented herein may provide a certain power improvement at a device (e.g., a 19% improvement in power at a device) due to a reduction in display refresh rate (e.g., a reduction in display refresh rate from 120 Hz to 60 Hz). Also, aspects presented herein may provide a certain power improvement at a CPU (e.g., a 28% improvement in power at a CPU) due to optimal CPU tick configuration based on a reduced refresh rate and a reduced CPU utilization.

Figure 8:
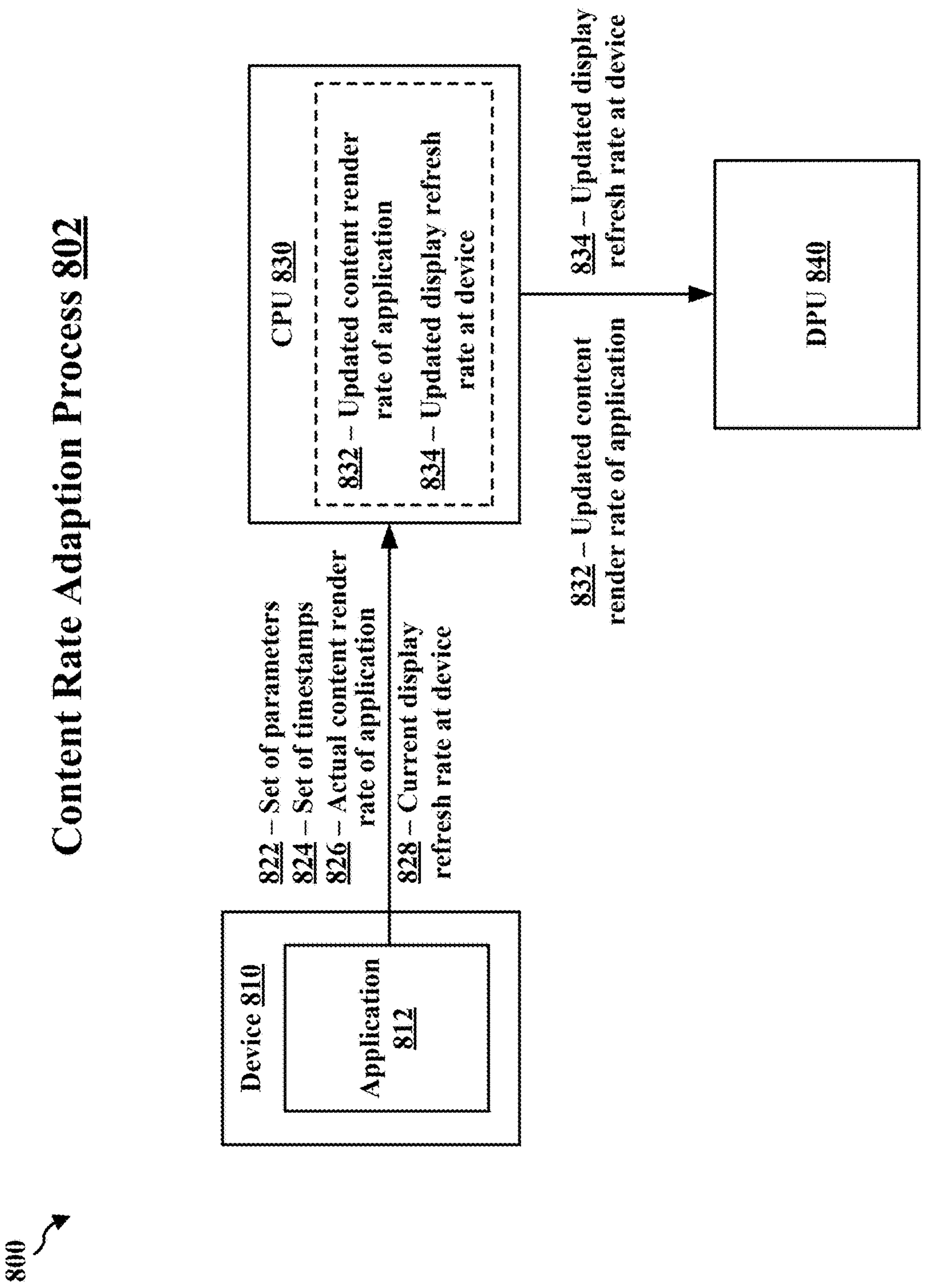
FIG. 8 is a diagram illustrating an example content rate adaptation process in accordance with one or more techniques of this disclosure.

FIG. 8 illustrates diagram 800 including one example of a content rate adaptation process. More specifically, diagram 800 depicts a content rate adaptation process 802 that utilizes the aforementioned considerations. As shown in FIG. 8, diagram 800 includes device 810, application 812, CPU 830, and DPU 840. As depicted in FIG. 8, the CPU 830 may obtain an indication of a set of parameters associated with an application 812 that is running on a device 810 (e.g., parameters 822) or a set of timestamps associated with a Vsync at the device (e.g., timestamps 824). Also, the CPU 830 may obtain an actual content render rate 826 of an application 812 based on a set of parameters associated with the application that is running on a device (e.g., parameters 822). Further, the CPU 830 may obtain or determine an updated content render rate 832 of the application based on the actual content render rate 826 of the application and a set of timestamps associated with the Vsync at the device (e.g., timestamps 824). The CPU 830 may also obtain an indication of the current display refresh rate 828 at the device. Moreover, the CPU 830 may identify or determine an updated display refresh rate at the device (e.g., updated display refresh rate 834) based on the updated content render rate 832 of the application and a current display refresh rate 828 at the device. The CPU 830 may transmit, to a DPU, the updated display refresh rate at the device (e.g., updated display refresh rate 834). The updated display refresh rate (e.g., updated display refresh rate 834) may be an optimal display refresh rate based on the frame rate adaptation model. Based on the updated display refresh rate at the device (e.g., updated display refresh rate 834), the CPU 830 may configure a set of parameters at the CPU. By doing so, the CPU 830 may optimize the power consumption at the device.

Aspects of the present disclosure may include a number of benefits or advantages. For instance, aspects of the present disclosure may develop an algorithm that can align display refresh rates to content rates. Aspects presented herein may also consider the application's desires when setting the refresh rate at the display. By doing so, aspects presented herein may optimize the display refresh rate and allow the display to not run at a higher refresh rate than necessary. Further, aspects presented herein may able to adjust the refresh rate without any indications (i.e., votes) from applications regarding the refresh rate. For instance, aspects presented herein may propose an algorithm that can accumulate information from applications in order to adjust the refresh rate and save power. That is, aspects presented herein may allow a display to optimize the display refresh rate in order to save power at the device. Additionally, aspects presented herein may consider the behavior of a display panel when setting the display refresh rate, such as variations in panel behavior (e.g., variations in vertical synchronization (VSync) behavior). As such, aspects presented herein may consider an application's desires and panel behavior when setting the display refresh rate in order to optimize the power consumption at the device.

Figure 9:
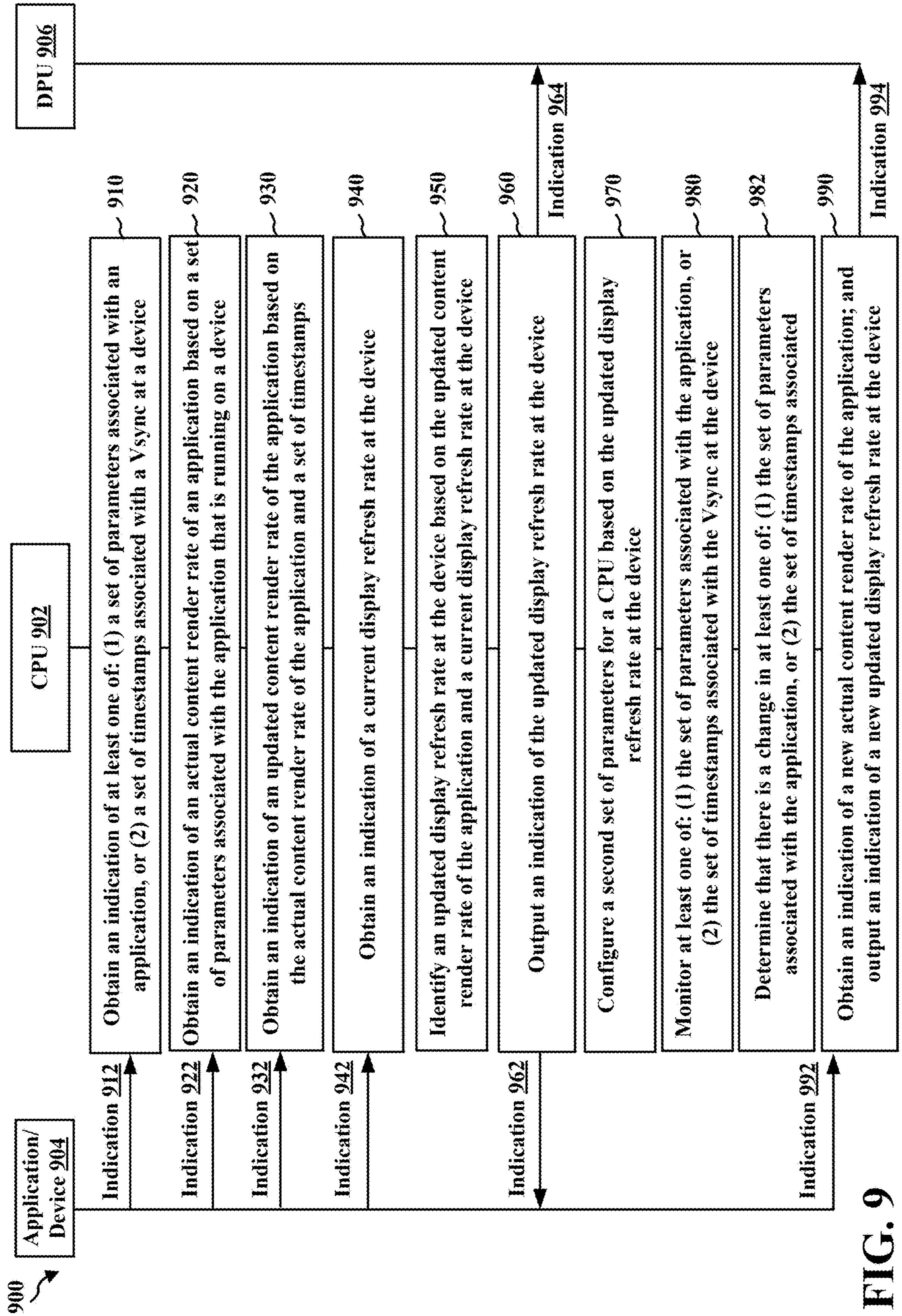
FIG. 9 is a communication flow diagram illustrating example communications between a CPU, an application/device, and a DPU in accordance with one or more techniques of this disclosure.

FIG. 9 is a communication flow diagram 900 of display processing in accordance with one or more techniques of this disclosure. As shown in FIG. 9, diagram 900 includes example communications between CPU 902 (e.g., a CPU, a CPU component, a compositor, another central processor, a DPU, a DPU component, another display processor, a GPU, a GPU component, another graphics processor), application/device 904 (e.g., an application, a display device, a CPU, a CPU component, a compositor, another central processor, a DPU, a DPU component, another display processor a GPU, a GPU component, another graphics processor), and DPU 906 (e.g., a DPU, a DPU component, another display processor, an application, a display device, a CPU, a CPU component, a compositor, another central processor, a GPU, a GPU component, another graphics processor a memory, a cache, a system memory, a graphics memory, a memory or cache at a CPU, or a memory or cache at a GPU), in accordance with one or more techniques of this disclosure.

At 910, CPU 902 may obtain an indication of at least one of: (1) a set of parameters associated with an application, or (2) a set of timestamps associated with a vertical synchronization (Vsync) at a device. In some aspects, obtaining the indication of the current display refresh rate at the device may comprise: receiving, from the device, the indication of the current display refresh rate. For example, CPU 902 may receive indication 912 from application/device 904. Additionally, the set of parameters may include at least one of a set of buffer queue timestamps or a set of buffer dequeue timestamps. Also, each of the set of buffer queue timestamps may correspond to a time at which a particular frame is queued for display at the device, and each of the set of buffer dequeue timestamps may correspond to a time at which a particular frame is dequeued for rendering at the application. Moreover, each of the set of timestamps associated with the Vsync may correspond to a time at which a particular frame is being displayed at the device.

At 920, CPU 902 may obtain an indication of an actual content render rate of an application based on a set of parameters, where the set of parameters is associated with the application that is running on a device. For example, CPU 902 may obtain indication 922 from application/device 904. In some aspects, obtaining the indication of the actual content render rate of the application may comprise: determining the actual content render rate of the application based on the set of parameters. Additionally, obtaining the indication of the actual content render rate of the application may comprise: receiving, from the application, the indication of the actual content render rate of the application.

At 930, CPU 902 may obtain an indication of an updated content render rate of the application based on the actual content render rate of the application and a set of timestamps associated with a vertical synchronization (Vsync) at the device. For example, CPU 902 may obtain indication 932 from application/device 904. In some aspects, obtaining the indication of the updated content render rate of the application based on the actual content render rate of the application and the set of timestamps may comprise: determining, using a frame rate adaptation model, the updated content render rate of the application based on the actual content render rate of the application and the set of timestamps. Also, the updated content render rate of the application may be a normalized content render rate of the application based on the frame rate adaptation model.

At 940, CPU 902 may obtain an indication of a current display refresh rate at the device, where identification of an updated display refresh rate is based on obtainment of the current display refresh rate. For example, CPU 902 may obtain indication 942 from application/device 904.

At 950, CPU 902 may identify an updated display refresh rate at the device based on the updated content render rate of the application and a current display refresh rate at the device. In some aspects, identifying the updated display refresh rate at the device based on the updated content render rate of the application and the current display refresh rate at the device may comprise: determining, using a frame rate adaptation model, the updated display refresh rate at the device based on the updated content render rate of the application and the current display refresh rate at the device. Also, the updated display refresh rate may be an optimal display refresh rate based on the frame rate adaptation model.

At 960, CPU 902 may output an indication of the updated display refresh rate at the device. In some aspects, outputting the indication of the updated display refresh rate at the device may comprise: transmitting, to a display processing unit (DPU), the indication of the updated display refresh rate at the device. For example, CPU 902 may transmit indication 962 to application/device 904. For example, CPU 902 may transmit indication 964 to DPU 906. Also, outputting the indication of the updated display refresh rate at the device may comprise: storing, in a memory or a cache, the indication of the updated display refresh rate at the device. For example, CPU 902 may store indication 964 in a memory.

At 970, CPU 902 may configure a second set of parameters for a central processing unit (CPU) based on the updated display refresh rate at the device. In some aspects, configuring the set of parameters for the CPU may comprise: configuring, using a hardware abstraction layer at the CPU, the second set of parameters for the CPU based on the updated display refresh rate at the device. Also, the set of parameters for the CPU may include a set of scheduling parameters at the CPU.

At 980, CPU 902 may monitor at least one of: (1) the set of parameters associated with the application, or (2) the set of timestamps associated with the Vsync at the device.

At 982, CPU 902 may determine that there is a change in at least one of: (1) the set of parameters associated with the application, or (2) the set of timestamps associated with the Vsync at the device.

At 990, CPU 902 may obtain an indication of a new actual content render rate of the application; determine a new updated content render rate of the application based on the new actual content render rate of the application and the set of timestamps associated with the Vsync; determine a new updated display refresh rate at the device based on the new updated content render rate of the application and a new current display refresh rate at the device; and output an indication of the new updated display refresh rate at the device. For example, CPU 902 may obtain, from application/device 904, indication 992 of a new actual content render rate of the application. For example, CPU 902 may output, to DPU 906, indication 994 of the new updated display refresh rate at the device.

Figure 10:
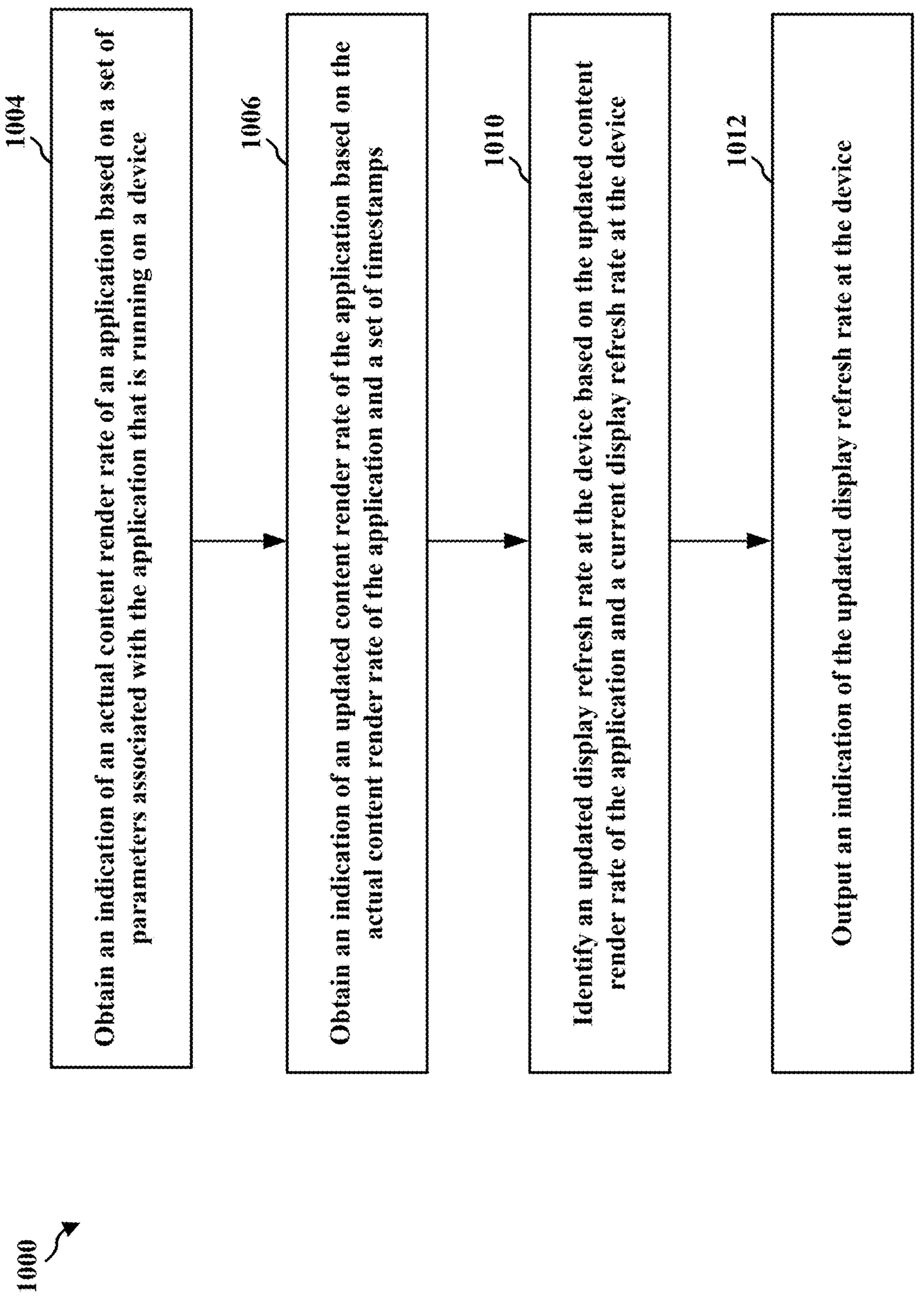
FIG. 10 is a flowchart of an example method of display processing in accordance with one or more techniques of this disclosure.

FIG. 10 is a flowchart 1000 of an example method of display processing in accordance with one or more techniques of this disclosure. The method may be performed by a CPU (e.g., a CPU, a CPU component, a compositor, another central processor, a DPU, a DPU component, another display processor a GPU, a GPU component, another graphics processor), an application/device (e.g., an application, a display device, a CPU, a CPU component, a compositor, another central processor, a DPU, a DPU component, another display processor a GPU, a GPU component, another graphics processor), a DPU (e.g., a DPU, a DPU component, another display processor, an application, a display device, a CPU, a CPU component, a compositor, another central processor, a GPU, a GPU component, another graphics processor a memory, a cache, a system memory, a graphics memory, a memory or cache at a CPU, or a memory or cache at a GPU) a display driver integrated circuit (DDIC), an apparatus for display processing, a wireless communication device, and/or any apparatus that may perform display processing as used in connection with the examples of FIGS. 1-9.

At 1004, the CPU may obtain an indication of an actual content render rate of an application based on a set of parameters, where the set of parameters is associated with the application that is running on a device, as described in connection with the examples in FIGS. 1-9. For example, as described in 920 of FIG. 9, CPU 902 may obtain an indication of an actual content render rate of an application based on a set of parameters, where the set of parameters is associated with the application that is running on a device. Further, step 1004 may be performed by processing unit 120 in FIG. 1. In some aspects, obtaining the indication of the actual content render rate of the application may comprise: determining the actual content render rate of the application based on the set of parameters. Additionally, obtaining the indication of the actual content render rate of the application may comprise: receiving, from the application, the indication of the actual content render rate of the application.

At 1006, the CPU may obtain an indication of an updated content render rate of the application based on the actual content render rate of the application and a set of timestamps associated with a vertical synchronization (Vsync) at the device, as described in connection with the examples in FIGS. 1-9. For example, as described in 930 of FIG. 9, CPU 902 may obtain an indication of an updated content render rate of the application based on the actual content render rate of the application and a set of timestamps associated with a vertical synchronization (Vsync) at the device. Further, step 1006 may be performed by processing unit 120 in FIG. 1. In some aspects, obtaining the indication of the updated content render rate of the application based on the actual content render rate of the application and the set of timestamps may comprise: determining, using a frame rate adaptation model, the updated content render rate of the application based on the actual content render rate of the application and the set of timestamps. Also, the updated content render rate of the application may be a normalized content render rate of the application based on the frame rate adaptation model.

At 1010, the CPU may identify an updated display refresh rate at the device based on the updated content render rate of the application and a current display refresh rate at the device, as described in connection with the examples in FIGS. 1-9. For example, as described in 950 of FIG. 9, CPU 902 may identify an updated display refresh rate at the device based on the updated content render rate of the application and a current display refresh rate at the device. Further, step 1010 may be performed by processing unit 120 in FIG. 1. In some aspects, identifying the updated display refresh rate at the device based on the updated content render rate of the application and the current display refresh rate at the device may comprise: determining, using a frame rate adaptation model, the updated display refresh rate at the device based on the updated content render rate of the application and the current display refresh rate at the device. Also, the updated display refresh rate may be an optimal display refresh rate based on the frame rate adaptation model.

At 1012, the CPU may output an indication of the updated display refresh rate at the device, as described in connection with the examples in FIGS. 1-9. For example, as described in 960 of FIG. 9, CPU 902 may output an indication of the updated display refresh rate at the device. Further, step 1012 may be performed by processing unit 120 in FIG. 1. In some aspects, outputting the indication of the updated display refresh rate at the device may comprise: transmitting, to a display processing unit (DPU), the indication of the updated display refresh rate at the device. Also, outputting the indication of the updated display refresh rate at the device may comprise: storing, in a memory or a cache, the indication of the updated display refresh rate at the device.

Figure 11:
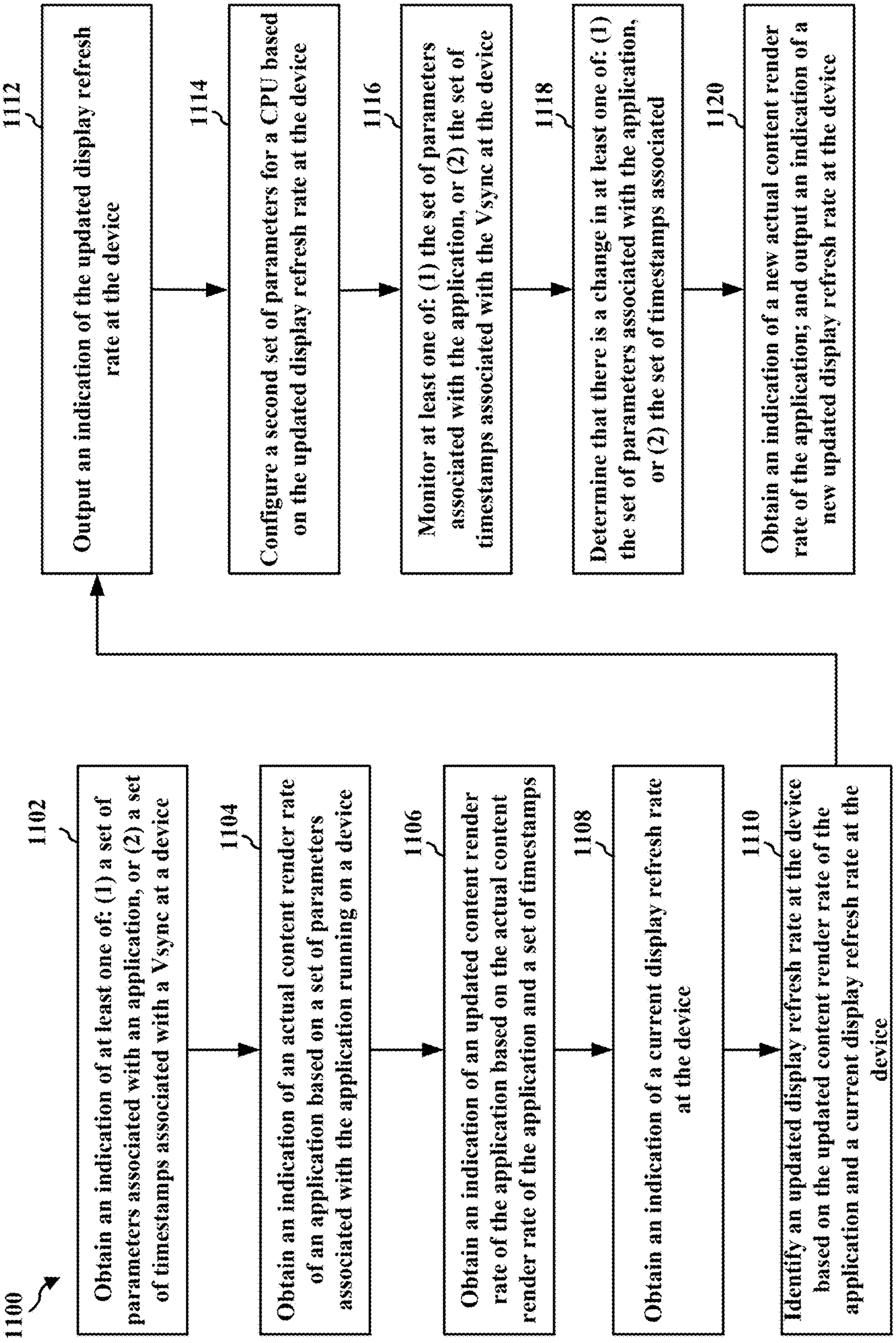
FIG. 11 is a flowchart of an example method of display processing in accordance with one or more techniques of this disclosure.

FIG. 11 is a flowchart 1100 of an example method of display processing in accordance with one or more techniques of this disclosure. The method may be performed by a CPU (e.g., a CPU, a CPU component, a compositor, another central processor, a DPU, a DPU component, another display processor a GPU, a GPU component, another graphics processor), an application/device (e.g., an application, a display device, a CPU, a CPU component, a compositor, another central processor, a DPU, a DPU component, another display processor a GPU, a GPU component, another graphics processor), a DPU (e.g., a DPU, a DPU component, another display processor, an application, a display device, a CPU, a CPU component, a compositor, another central processor, a GPU, a GPU component, another graphics processor a memory, a cache, a system memory, a graphics memory, a memory or cache at a CPU, or a memory or cache at a GPU) a display driver integrated circuit (DDIC), an apparatus for display processing, a wireless communication device, and/or any apparatus that may perform display processing as used in connection with the examples of FIGS. 1-9.

At 1102, the CPU may obtain an indication of at least one of: (1) a set of parameters associated with an application, or (2) a set of timestamps associated with a vertical synchronization (Vsync) at a device, as described in connection with the examples in FIGS. 1-9. For example, as described in 910 of FIG. 9, CPU 902 may obtain an indication of at least one of: (1) a set of parameters associated with an application, or (2) a set of timestamps associated with a vertical synchronization (Vsync) at a device. Further, step 1102 may be performed by processing unit 120 in FIG. 1. In some aspects, obtaining the indication of the current display refresh rate at the device may comprise: receiving, from the device, the indication of the current display refresh rate. Additionally, the set of parameters may include at least one of a set of buffer queue timestamps or a set of buffer dequeue timestamps. Also, each of the set of buffer queue timestamps may correspond to a time at which a particular frame is queued for display at the device, and each of the set of buffer dequeue timestamps may correspond to a time at which a particular frame is dequeued for rendering at the application. Moreover, each of the set of timestamps associated with the Vsync may correspond to a time at which a particular frame is being displayed at the device.

At 1104, the CPU may obtain an indication of an actual content render rate of an application based on a set of parameters, where the set of parameters is associated with the application that is running on a device, as described in connection with the examples in FIGS. 1-9. For example, as described in 920 of FIG. 9, CPU 902 may obtain an indication of an actual content render rate of an application based on a set of parameters, where the set of parameters is associated with the application that is running on a device. Further, step 1104 may be performed by processing unit 120 in FIG. 1. In some aspects, obtaining the indication of the actual content render rate of the application may comprise: determining the actual content render rate of the application based on the set of parameters. Additionally, obtaining the indication of the actual content render rate of the application may comprise: receiving, from the application, the indication of the actual content render rate of the application.

At 1106, the CPU may obtain an indication of an updated content render rate of the application based on the actual content render rate of the application and a set of timestamps associated with a vertical synchronization (Vsync) at the device, as described in connection with the examples in FIGS. 1-9. For example, as described in 930 of FIG. 9, CPU 902 may obtain an indication of an updated content render rate of the application based on the actual content render rate of the application and a set of timestamps associated with a vertical synchronization (Vsync) at the device. Further, step 1106 may be performed by processing unit 120 in FIG. 1. In some aspects, obtaining the indication of the updated content render rate of the application based on the actual content render rate of the application and the set of timestamps may comprise: determining, using a frame rate adaptation model, the updated content render rate of the application based on the actual content render rate of the application and the set of timestamps. Also, the updated content render rate of the application may be a normalized content render rate of the application based on the frame rate adaptation model.

At 1108, the CPU may obtain an indication of a current display refresh rate at the device, where identification of an updated display refresh rate is based on obtainment of the current display refresh rate, as described in connection with the examples in FIGS. 1-9. For example, as described in 940 of FIG. 9, CPU 902 may obtain an indication of a current display refresh rate at the device, where identification of an updated display refresh rate is based on obtainment of the current display refresh rate. Further, step 1108 may be performed by processing unit 120 in FIG. 1.

At 1110, the CPU may identify an updated display refresh rate at the device based on the updated content render rate of the application and a current display refresh rate at the device, as described in connection with the examples in FIGS. 1-9. For example, as described in 950 of FIG. 9, CPU 902 may identify an updated display refresh rate at the device based on the updated content render rate of the application and a current display refresh rate at the device. Further, step 1110 may be performed by processing unit 120 in FIG. 1. In some aspects, identifying the updated display refresh rate at the device based on the updated content render rate of the application and the current display refresh rate at the device may comprise: determining, using a frame rate adaptation model, the updated display refresh rate at the device based on the updated content render rate of the application and the current display refresh rate at the device. Also, the updated display refresh rate may be an optimal display refresh rate based on the frame rate adaptation model.

At 1112, the CPU may output an indication of the updated display refresh rate at the device, as described in connection with the examples in FIGS. 1-9. For example, as described in 960 of FIG. 9, CPU 902 may output an indication of the updated display refresh rate at the device. Further, step 1112 may be performed by processing unit 120 in FIG. 1. In some aspects, outputting the indication of the updated display refresh rate at the device may comprise: transmitting, to a display processing unit (DPU), the indication of the updated display refresh rate at the device. Also, outputting the indication of the updated display refresh rate at the device may comprise: storing, in a memory or a cache, the indication of the updated display refresh rate at the device.

At 1114, the CPU may configure a second set of parameters for a central processing unit (CPU) based on the updated display refresh rate at the device, as described in connection with the examples in FIGS. 1-9. For example, as described in 970 of FIG. 9, CPU 902 may configure a second set of parameters for a central processing unit (CPU) based on the updated display refresh rate at the device. Further, step 1114 may be performed by processing unit 120 in FIG. 1. In some aspects, configuring the set of parameters for the CPU may comprise: configuring, using a hardware abstraction layer at the CPU, the second set of parameters for the CPU based on the updated display refresh rate at the device. Also, the set of parameters for the CPU may include a set of scheduling parameters at the CPU.

At 1116, the CPU may monitor at least one of: (1) the set of parameters associated with the application, or (2) the set of timestamps associated with the Vsync at the device, as described in connection with the examples in FIGS. 1-9. For example, as described in 980 of FIG. 9, CPU 902 may monitor at least one of: (1) the set of parameters associated with the application, or (2) the set of timestamps associated with the Vsync at the device. Further, step 1116 may be performed by processing unit 120 in FIG. 1.

At 1118, the CPU may determine that there is a change in at least one of: (1) the set of parameters associated with the application, or (2) the set of timestamps associated with the Vsync at the device, as described in connection with the examples in FIGS. 1-9. For example, as described in 982 of FIG. 9, CPU 902 may determine that there is a change in at least one of: (1) the set of parameters associated with the application, or (2) the set of timestamps associated with the Vsync at the device. Further, step 1118 may be performed by processing unit 120 in FIG. 1.

At 1120, the CPU may obtain an indication of a new actual content render rate of the application; determine a new updated content render rate of the application based on the new actual content render rate of the application and the set of timestamps associated with the Vsync; determine a new updated display refresh rate at the device based on the new updated content render rate of the application and a new current display refresh rate at the device; and output an indication of the new updated display refresh rate at the device, as described in connection with the examples in FIGS. 1-9. For example, as described in 990 of FIG. 9, CPU 902 may obtain an indication of a new actual content render rate of the application; determine a new updated content render rate of the application based on the new actual content render rate of the application and the set of timestamps associated with the Vsync; determine a new updated display refresh rate at the device based on the new updated content render rate of the application and a new current display refresh rate at the device; and output an indication of the new updated display refresh rate at the device. Further, step 1120 may be performed by processing unit 120 in FIG. 1.

In configurations, a method or an apparatus for display processing is provided. The apparatus may be a CPU (or other central processor), a compositor, a DPU (or other display processor), a GPU (or other graphics processor), a DDIC, an apparatus for display processing, and/or some other processor that may perform display processing. In aspects, the apparatus may be the processing unit 120 within the device 104, or may be some other hardware within the device 104 or another device. The apparatus, e.g., processing unit 120, may include means for obtaining an indication of an actual content render rate of an application based on a set of parameters, where the set of parameters is associated with the application that is running on a device. The apparatus, e.g., processing unit 120, may also include means for obtaining an indication of an updated content render rate of the application based on the actual content render rate of the application and a set of timestamps associated with a vertical synchronization (Vsync) at the device. The apparatus, e.g., processing unit 120, may also include means for identifying an updated display refresh rate at the device based on the updated content render rate of the application and a current display refresh rate at the device. The apparatus, e.g., processing unit 120, may also include means for outputting an indication of the updated display refresh rate at the device. The apparatus, e.g., processing unit 120, may also include means for obtaining an indication of the current display refresh rate at the device, where identification of the updated display refresh rate is based on obtainment of the current display refresh rate. The apparatus, e.g., processing unit 120, may also include means for obtaining an indication of at least one of: (1) the set of parameters associated with the application, or (2) the set of timestamps associated with the Vsync at the device. The apparatus, e.g., processing unit 120, may also include means for configuring a second set of parameters for a central processing unit (CPU) based on the updated display refresh rate at the device. The apparatus, e.g., processing unit 120, may also include means for monitoring at least one of: (1) the set of parameters associated with the application, or (2) the set of timestamps associated with the Vsync at the device. The apparatus, e.g., processing unit 120, may also include means for determining that there is a change in at least one of: (1) the set of parameters associated with the application, or (2) the set of timestamps associated with the Vsync at the device. The apparatus, e.g., processing unit 120, may also include means for obtaining an indication of a new actual content render rate of the application; means for determining a new updated content render rate of the application based on the new actual content render rate of the application and the set of timestamps associated with the Vsync; means for determining a new updated display refresh rate at the device based on the new updated content render rate of the application and a new current display refresh rate at the device; and means for outputting an indication of the new updated display refresh rate at the device.

The subject matter described herein may be implemented to realize one or more benefits or advantages. For instance, the described display processing techniques may be used by a CPU, a central processor, a compositor, a DPU, or some other processor that may perform display processing to implement the content rate adaptation techniques described herein. This may also be accomplished at a low cost compared to other display processing techniques. Moreover, the display processing techniques herein may improve or speed up graphics processing or execution. Further, the display processing techniques herein may improve resource or data utilization and/or resource efficiency. Additionally, aspects of the present disclosure may utilize content rate adaptation techniques in order to improve memory bandwidth efficiency and/or increase processing speed at a CPU, a DPU, or a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof"

include any combination of A, B, and/or C, and may include multiples of A, multiples of B, or multiples of C. Specifically, combinations such as “at least one of A, B, or C,” “one or more of A, B, or C,” “at least one of A, B, and C,” “one or more of A, B, and C,” and “A, B, C, or any combination thereof” may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words “module,” “mechanism,” “element,” “device,” and the like may not be a substitute for the word “means.” As such, no claim element is to be construed as a means plus function unless the element is expressly recited using the phrase “means for.”

In one or more examples, the functions described herein may be implemented in hardware, software, firmware, or any combination thereof. For example, although the term “processing unit” has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term “or” may be interpreted as “and/or” where context does not dictate otherwise. Additionally, while phrases such as “one or more” or “at least one” or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term “processing unit” has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term “processor,” as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term “processor,” as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for display processing, including at least one memory and at least one processor coupled to the at least one memory and, based at least in part on information stored in the at least one memory, the at least one processor, individually or in any combination, is configured to: obtain an indication of an actual content render rate of an application based on a set of parameters, wherein the set of parameters is associated with the application that is running on a device; obtain an indication of an updated content render rate of the application based on the actual content render rate of the application and a set of timestamps associated with a vertical synchronization (Vsync) at the device; identify an updated display refresh rate at the device based on the updated content render rate of the application and a current display refresh rate at the device; and output an indication of the updated display refresh rate at the device.

Aspect 2 is the apparatus of aspect 1, wherein to identify the updated display refresh rate at the device based on the updated content render rate of the application and the current display refresh rate at the device, the at least one processor is configured to: determine, using a frame rate adaptation model, the updated display refresh rate at the device based on the updated content render rate of the application and the current display refresh rate at the device.

Aspect 3 is the apparatus of aspect 2, wherein the updated display refresh rate is an optimal display refresh rate based on the frame rate adaptation model.

Aspect 4 is the apparatus of any of aspects 1 to 3, wherein the at least one processor is further configured to: obtain an indication of the current display refresh rate at the device, wherein identification of the updated display refresh rate is based on obtainment of the current display refresh rate.

Aspect 5 is the apparatus of aspect 4, wherein to obtain the indication of the current display refresh rate at the device, the at least one processor is configured to: receive, from the device, the indication of the current display refresh rate.

Aspect 6 is the apparatus of any of aspects 1 to 5, wherein the at least one processor is further configured to: obtain an indication of at least one of: (1) the set of parameters associated with the application, or (2) the set of timestamps associated with the Vsync at the device.

Aspect 7 is the apparatus of aspect 6, wherein the set of parameters includes at least one of a set of buffer queue timestamps or a set of buffer dequeue timestamps.

Aspect 8 is the apparatus of aspect 7, wherein each of the set of buffer queue timestamps corresponds to a time at which a particular frame is queued for display at the device, and wherein each of the set of buffer dequeue timestamps corresponds to a time at which a particular frame is dequeued for rendering at the application.

Aspect 9 is the apparatus of any of aspects 6 to 8, wherein each of the set of timestamps associated with the Vsync corresponds to a time at which a particular frame is being displayed at the device.

Aspect 10 is the apparatus of any of aspects 1 to 9, wherein to obtain the indication of the updated content render rate of the application based on the actual content render rate of the application and the set of timestamps, the at least one processor is configured to: determine, using a frame rate adaptation model, the updated content render rate of the application based on the actual content render rate of the application and the set of timestamps.

Aspect 11 is the apparatus of aspect 10, wherein the updated content render rate of the application is a normalized content render rate of the application based on the frame rate adaptation model.

Aspect 12 is the apparatus of any of aspects 1 to 11, wherein to obtain the indication of the actual content render rate of the application, the at least one processor is configured to: determine the actual content render rate of the application based on the set of parameters.

Aspect 13 is the apparatus of any of aspects 1 to 12, wherein to obtain the indication of the actual content render rate of the application, the at least one processor is configured to: receive, from the application, the indication of the actual content render rate of the application.

Aspect 14 is the apparatus of any of aspects 1 to 13, wherein the at least one processor is further configured to: configure a second set of parameters for a central processing unit (CPU) based on the updated display refresh rate at the device.

Aspect 15 is the apparatus of aspect 14, wherein to configure the set of parameters for the CPU, the at least one processor is configured to: configure, using a hardware abstraction layer at the CPU, the second set of parameters for the CPU based on the updated display refresh rate at the device.

Aspect 16 is the apparatus of any of aspects 14 to 15, wherein the set of parameters for the CPU includes a set of scheduling parameters at the CPU.

Aspect 17 is the apparatus of any of aspects 1 to 16, wherein the at least one processor is further configured to: monitor at least one of: (1) the set of parameters associated with the application, or (2) the set of timestamps associated with the Vsync at the device.

Aspect 18 is the apparatus of aspect 17, wherein the at least one processor is further configured to: determine that there is a change in at least one of: (1) the set of parameters associated with the application, or (2) the set of timestamps associated with the Vsync at the device.

Aspect 19 is the apparatus of aspect 18, wherein the at least one processor is further configured to: obtain an indication of a new actual content render rate of the application; determine a new updated content render rate of the application based on the new actual content render rate of the application and the set of timestamps associated with the Vsync; determine a new updated display refresh rate at the device based on the new updated content render rate of the application and a new current display refresh rate at the device; and output an indication of the new updated display refresh rate at the device.

Aspect 20 is the apparatus of any of aspects 1 to 19, wherein to output the indication of the updated display refresh rate at the device, the at least one processor is configured to: transmit, to a display processing unit (DPU), the indication of the updated display refresh rate at the device; or store, in a memory or a cache, the indication of the updated display refresh rate at the device.

Aspect 21 is the apparatus of aspect 20, further including (i.e., comprising) at least one of an antenna or a transceiver coupled to the at least one processor, wherein to transmit the indication of the updated display refresh rate at the device, the at least one processor is configured to: transmit, via at least one of an antenna or a transceiver, the indication of the updated display refresh rate at the device.

Aspect 22 is the apparatus of any of aspects 1 to 21, wherein the apparatus is a wireless communication device.

Aspect 23 is a method of display processing for implementing any of aspects 1 to 21.

Aspect 24 is an apparatus for display processing including means for implementing any of aspects 1 to 21.

Aspect 25 is a computer-readable medium (e.g., a non-transitory computer-readable medium) storing computer executable code (e.g., code for display processing), the code when executed by at least one processor causes the at least one processor to implement any of aspects 1 to 21.

What is claimed is:

1. An apparatus for display processing, comprising:

at least one memory; and at least one processor coupled to the at least one memory and, based at least in part on information stored in the at least one memory, the at least one processor is configured to:

obtain an indication of an actual content render rate of an application based on a set of parameters, wherein the set of parameters is associated with the application that is running on a device;

obtain an indication of an updated content render rate of the application based on the actual content render rate of the application and a set of timestamps associated with a vertical synchronization (Vsync) at the device;

determine, using a frame rate adaptation model, an updated display refresh rate at the device based on the updated content render rate of the application and a current display refresh rate at the device, wherein the frame rate adaptation model is associated with the set of parameters associated with the application and the set of timestamps associated with the Vsync at the device;

configure a second set of parameters for a central processing unit (CPU) based on the updated display refresh rate at the device, wherein the set of parameters for the CPU includes a set of scheduling parameters at the CPU; and output an indication of the updated display refresh rate at the device.

2. The apparatus of claim 1, wherein the updated display refresh rate is an optimal display refresh rate based on the frame rate adaptation model.

3. The apparatus of claim 1, wherein the at least one processor is further configured to:

obtain an indication of the current display refresh rate at the device, wherein identification of the updated display refresh rate is based on obtainment of the current display refresh rate.

4. The apparatus of claim 3, wherein to obtain the indication of the current display refresh rate at the device, the at least one processor is configured to:

receive, from the device, the indication of the current display refresh rate.

5. The apparatus of claim 1, wherein the at least one processor is further configured to:

obtain an indication of at least one of: (1) the set of parameters associated with the application, or (2) the set of timestamps associated with the Vsync at the device.

6. The apparatus of claim 5, wherein the set of parameters includes at least one of a set of buffer queue timestamps or a set of buffer dequeue timestamps.

7. The apparatus of claim 6, wherein each of the set of buffer queue timestamps corresponds to a time at which a particular frame is queued for display at the device, and wherein each of the set of buffer dequeue timestamps corresponds to a time at which a particular frame is dequeued for rendering at the application.

8. The apparatus of claim 5, wherein each of the set of timestamps associated with the Vsync corresponds to a time at which a particular frame is being displayed at the device.

9. The apparatus of claim 1, wherein to obtain the indication of the updated content render rate of the application based on the actual content render rate of the application and the set of timestamps, the at least one processor is configured to:

determine, using the frame rate adaptation model, the updated content render rate of the application based on the actual content render rate of the application and the set of timestamps.

10. The apparatus of claim 9, wherein the updated content render rate of the application is a normalized content render rate of the application based on the frame rate adaptation model.

11. The apparatus of claim 1, wherein to obtain the indication of the actual content render rate of the application, the at least one processor is configured to:

determine the actual content render rate of the application based on the set of parameters.

12. The apparatus of claim 1, wherein to obtain the indication of the actual content render rate of the application, the at least one processor is configured to:

receive, from the application, the indication of the actual content render rate of the application.

13. The apparatus of claim 1, wherein to configure the set of parameters for the CPU, the at least one processor is configured to:

configure, using a hardware abstraction layer at the CPU, the second set of parameters for the CPU based on the updated display refresh rate at the device.

14. The apparatus of claim 1, wherein the at least one processor is further configured to:

monitor at least one of: (1) the set of parameters associated with the application, or (2) the set of timestamps associated with the Vsync at the device; and determine that there is a change in at least one of: (1) the set of parameters associated with the application, or (2) the set of timestamps associated with the Vsync at the device.

15. The apparatus of claim 14, wherein the at least one processor is further configured to:

obtain an indication of a new actual content render rate of the application;

determine a new updated content render rate of the application based on the new actual content render rate of the application and the set of timestamps associated with the Vsync;

determine a new updated display refresh rate at the device based on the new updated content render rate of the application and a new current display refresh rate at the device; and output an indication of the new updated display refresh rate at the device.

16. A method of display processing, comprising:

obtaining an indication of an actual content render rate of an application based on a set of parameters, wherein the set of parameters is associated with the application that is running on a device;

obtaining an indication of an updated content render rate of the application based on the actual content render rate of the application and a set of timestamps associated with a vertical synchronization (Vsync) at the device;

determining, using a frame rate adaptation model, an updated display refresh rate at the device based on the updated content render rate of the application and a current display refresh rate at the device, wherein the frame rate adaptation model is associated with the set of parameters associated with the application and the set of timestamps associated with the Vsync at the device;

configuring a second set of parameters for a central processing unit (CPU) based on the updated display refresh rate at the device, wherein the set of parameters for the CPU includes a set of scheduling parameters at the CPU; and outputting an indication of the updated display refresh rate at the device.

17. A non-transitory computer-readable medium storing computer executable code for display processing, the code when executed by at least one processor causes the at least one processor to:

obtain an indication of an actual content render rate of an application based on a set of parameters, wherein the set of parameters is associated with the application that is running on a device;

obtain an indication of an updated content render rate of the application based on the actual content render rate of the application and a set of timestamps associated with a vertical synchronization (Vsync) at the device;

determine, using a frame rate adaptation model, an updated display refresh rate at the device based on the updated content render rate of the application and a current display refresh rate at the device, wherein the frame rate adaptation model is associated with the set of parameters associated with the application and the set of timestamps associated with the Vsync at the device;

configure a second set of parameters for a central processing unit (CPU) based on the updated display refresh rate at the device, wherein the set of parameters for the CPU includes a set of scheduling parameters at the CPU; and output an indication of the updated display refresh rate at the device.

* * * * *